(12) United States Patent
Su et al.

(10) Patent No.: US 10,608,766 B2
(45) Date of Patent: Mar. 31, 2020

(54) MULTI-SERVICE TRANSPORT AND RECEIVING METHOD AND APPARATUS

(71) Applicant: Huawei Technologies Co., Ltd., Shenzhen (CN)

(72) Inventors: Wei Su, Chengdu (CN); Maarten Petrus Joseph Vissers, Amsterdam (NL)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/046,632

(22) Filed: Jul. 26, 2018

(65) Prior Publication Data

US 2018/0375604 A1  Dec. 27, 2018

Related U.S. Application Data

(63) Continuation of application No. PCT/CN2016/091055, filed on Jul. 22, 2016.

(51) Int. Cl.
```
H04J 14/00      (2006.01)
H04J 3/16       (2006.01)
H04Q 11/00      (2006.01)
```

(52) U.S. Cl.
CPC ........ *H04J 3/1664* (2013.01); *H04Q 11/0062* (2013.01); *H04J 2203/0012* (2013.01); *H04J 2203/0057* (2013.01); *H04J 2203/0071* (2013.01)

(58) Field of Classification Search
CPC ........... H04Q 11/0062; H04Q 11/0066; H04Q 11/0067; H04B 10/27; H04B 10/516; H04J 3/1652; H04J 3/1658; H04J 3/1664; H04J 3/0658; H04J 14/08

USPC ........ 398/45, 46, 47, 48, 49, 50, 51, 52, 53, 398/56, 57, 79, 33, 98, 83, 59, 183, 135, 398/136; 370/535, 539, 545, 472, 476, 370/474

See application file for complete search history.

(56) References Cited

U.S. PATENT DOCUMENTS

| | | |
|---|---|---|
| 2003/0048813 A1 | 3/2003 | Lahav et al. |
| 2007/0248121 A1 | 10/2007 | Zou |
| 2012/0002965 A1* | 1/2012 | Bellato ........... H04J 3/1652 |
| | | 398/52 |

(Continued)

FOREIGN PATENT DOCUMENTS

| | | |
|---|---|---|
| CN | 1790993 A | 6/2006 |
| CN | 101155006 A | 4/2008 |

(Continued)

OTHER PUBLICATIONS

Takashi Kuwabara Fujitsu Japan, "B100G ODUflex with modular frame structure (ODUflexM)," International Telecommunication Union, vol. 11/15, Mar. 2014. pp. 1-8.

*Primary Examiner* — Hanh Phan
(74) *Attorney, Agent, or Firm* — Slater Matsil, LLP

(57) ABSTRACT

A multi-service transport and receiving method and apparatus are provided. The method includes: obtaining mapping transport control information of M services; determining a mapping procedure of the M services; and mapping the M services to a variable optical payload unit according to the mapping procedure. Therefore, a transport solution can be flexibly customized based on a transport requirement of a client service, so that a data plane becomes programmable.

20 Claims, 14 Drawing Sheets

(56) References Cited

U.S. PATENT DOCUMENTS

| | | |
|---|---|---|
| 2012/0039609 A1 | 2/2012 | Dong et al. |
| 2012/0224858 A1 | 9/2012 | Chen et al. |
| 2015/0078752 A1 | 3/2015 | Wu et al. |
| 2015/0104178 A1 | 4/2015 | Su et al. |
| 2015/0139650 A1 | 5/2015 | Su et al. |
| 2016/0087739 A1* | 3/2016 | Kametani ............ H04J 3/0691 398/56 |
| 2016/0197691 A1 | 7/2016 | Su et al. |

FOREIGN PATENT DOCUMENTS

| | | |
|---|---|---|
| CN | 101841740 A | 9/2010 |
| CN | 102056031 A | 5/2011 |
| CN | 102377525 A | 3/2012 |
| JP | 2011176750 A | 9/2011 |
| JP | 2015531194 A | 10/2015 |
| WO | 2008125060 A1 | 10/2008 |
| WO | 2013159314 A1 | 10/2013 |
| WO | 2015035883 A1 | 3/2015 |

* cited by examiner

MULTI-SERVICE TRANSPORT AND RECEIVING METHOD AND APPARATUS

CROSS-REFERENCE TO RELATED APPLICATIONS

This application is a continuation of International Application No. PCT/CN2016/091055, filed on Jul. 22, 2016. The disclosure of the aforementioned application is hereby incorporated by reference in its entirety.

TECHNICAL FIELD

The present disclosure relates to the field of optical communications technologies, and in particular, to a multi-service transport and receiving method and apparatus.

BACKGROUND

Currently, as a core technology of a transport network, an optical transport network (OTN) includes technical specifications of an electrical layer and an optical layer, has abundant operation, administration and maintenance (OAM) capabilities, a strong tandem connection monitor (TCM) capability, and an out-of-band forward error correction (FEC) capability, and can implement flexible scheduling and management of a large-capacity service.

For an electrical processing layer, an OTN technology defines a standard encapsulation structure, and the standard encapsulation structure is used to implement mapping of various client services, so as to manage and monitor a client signal. An OTN frame structure is shown in FIG. 1. An OTN frame is a structure of 4×4080 bytes, that is, 4 rows×4080 columns. The OTN frame structure includes a framing area, an optical channel transport unit overhead (OTU OH), an optical channel data unit (ODU) OH, an optical channel payload unit (OPU) OH, an OPU payload area, and an FEC area. Herein, 16 head columns are overhead bytes, 256 tail columns are FEC check bytes, and 3808 intermediate columns are payloads.

An OPUk is used to adapt to a client signal, and includes an OPU payload area and an OPU OH, and k represents a rate level of an OPU. When k=1, 2, 3, and 4, k is respectively corresponding to fixed rate levels of 2.5 G, 10 G, 40 G, and 100 G. There are two fixed tributary slot granularities: 1.25 Gbit/s and 2.5 Gbit/s that are distinguished based on a payload type PT overhead. When PT=0×21, it denotes a tributary slot granularity is 1.25 G. When PT=0×20, it denotes tributary slot granularity is 2.5 G. When k=flex, that is, an OPUflex, the OPUflex is corresponding to any rate level, has no tributary slot, and carries only a single service. When k=Cn, that is, an OPUCn, the OPUCn is corresponding to a rate level that is n times 100 G, and has only one fixed tributary slot, that is, 5 G. A payload type PT of the OPUCn is 0×22. An ODUk is used to support an information structure of the OPUk. The information structure includes information about the OPUk and an ODUk OH. Capacities of the ODUk are distinguished based on k. An OTUk includes the ODUk, the FEC area, and an OTUk OH. As service traffic increases and requirements are diversified, while bandwidth increases, a transport network has gradually evolved from a fixed pipe to an elastic pipe, for example, a lower order ODUflex bearer container or an OTUCn of n times 100 G. Especially, for the OTUCn of n times 100 G, a frame structure of the OTUCn includes n OTN frames (excluding the FEC area), and a tributary slot granularity corresponding to the OTUCn is 5 Gbit/s.

In the prior art, a conventional ODUflex is applied to only a single service, and carries and transports the single service in a fixed mapping manner.

Specifically, as shown in FIG. 2, a constant bit rate (CBR) service is mapped to the ODUflex by using a bit synchronous mapping procedure (BMP), and is then transported by using a higher order ODUk or an ODUCn. For a packet (PKT) service, when the packet service is less than or equal to 100 G, the packet service is mapped to the ODUflex by using a generic framing procedure (GFP), and is then transported by using the higher order ODUk or the ODUCn. When the packet service is greater than 100 G, the packet service is mapped to the ODUflex by using an idle mapping procedure (IMP), and is then transported by using the higher order ODUk or the ODUCn.

SUMMARY

Embodiments of the present disclosure provide a multi-service transport and receiving method and apparatus, so as to resolve a problem that an ODUflex can be applied only to a single service and cannot implement customized mapping and transport of a plurality of services.

According to a first aspect, a multi-service transport method includes: obtaining mapping transport control information of M services, where mapping transport control information of each service carries a transport requirement of the service; determining a mapping procedure for the M services based on the mapping transport control information of the M services. The mapping procedure is used to map the M services to a variable optical payload unit by using a programmable tributary slot group frame, and the programmable tributary slot group frame is a tributary slot set used to meet transport requirements corresponding to the M services; and mapping the M services to the variable optical payload unit according to the mapping procedure.

In an optional implementation, the transport requirement of each service includes a traffic volume required by the service; the mapping procedure includes at least: a quantity of tributary slots included in the programmable tributary slot group frame, a tributary slot rate, a frame structure of the programmable tributary slot group frame, and a quantity of tributary slots that each of the M services needs to occupy; and the determining a mapping procedure for the M services based on the mapping transport control information of the M services includes: determining, based on traffic volumes respectively corresponding to the M services, a quantity n of tributary slots included in the programmable tributary slot group frame and the tributary slot rate, where n≥1; determining the frame structure of the programmable tributary slot group frame based on the quantity n of tributary slots included in the programmable tributary slot group frame; and determining, based on the traffic volumes respectively corresponding to the M services and the tributary slot rate, the quantity of tributary slots that each service needs to occupy.

Therefore, according to the method provided in this embodiment of the present disclosure, a data plane becomes programmable, and tributary slots can be flexibly divided according to a service requirement.

In an optional implementation, the determining, based on traffic volumes respectively corresponding to the M services, a quantity n of tributary slots included in the payload tributary slot group frame and the tributary slot rate includes: calculating a proportional relationship for the traffic volumes of the M services based on the traffic volumes respectively corresponding to the M services; and determining, based on the traffic volumes respectively corresponding to the M services and the proportional relationship, the quantity n of tributary slots included in the programmable tributary slot group frame and the tributary slot rate.

Therefore, according to the method provided in this embodiment of the present disclosure, system bandwidth can be effectively used.

In an optional implementation, the frame structure of the programmable tributary slot group frame is: When the variable optical payload unit is an OPUflex, the programmable tributary slot group frame includes N1 code blocks whose preset code block granularity is s1 bytes, N1 is a common multiple of 3808/s1 and n, a rate of the programmable tributary slot group frame is n times the tributary slot rate, and a rate of the variable optical payload unit OPUflex is (239/238)*n times the tributary slot rate.

In an optional implementation, N1 is the least common multiple of 3808/s1 and n.

In an optional implementation, the frame structure of the programmable tributary slot group frame is: When the variable optical payload unit is an OPUKm, the programmable tributary slot group frame includes N2 code blocks whose preset code block granularity is s2 bytes, N2 is a common multiple of 3808*m/s2 and n, m is a quantity of OPU instances included in the OPUKm, a rate of the programmable tributary slot group frame is n times the tributary slot rate, and a rate of the variable optical payload unit OPUKm is (239/238)*n times the tributary slot rate.

In an optional implementation, N2 is the least common multiple of 3808*m/s2 and n.

In an optional implementation, the mapping the M services to the variable optical payload unit according to the mapping procedure includes: separately mapping the M services to at least one tributary slot of the programmable tributary slot group frame based on the quantity of tributary slots that each service needs to occupy, to obtain at least one programmable tributary slot group frame to which the M services are mapped; mapping, to a payload area of the variable optical payload unit based on the frame structure of the programmable tributary slot group frame, the at least one programmable tributary slot group frame to which the M services are mapped; and adding, to an overhead area of the variable optical payload unit, overhead information required to transport the M services.

In an optional implementation, the separately mapping the M services to at least one tributary slot of the programmable tributary slot group frame based on the quantity of tributary slots that each service needs to occupy includes: for each service, mapping, based on a quantity of tributary slots that a current service needs to occupy, the current service to a corresponding subcontainer included in the programmable tributary slot group frame, where the programmable tributary slot group frame includes M subcontainers obtained after division performed according to the M services, an $i^{th}$ subcontainer is corresponding to an $i^{th}$ service, the $i^{th}$ subcontainer includes $n_i$ tributary slots that the $i^{th}$ service needs to occupy, and $n_1+n_2+ \ldots +n_i+ \ldots +n_M \leq n$.

Therefore, according to the method provided in this embodiment of the present disclosure, services can be flexibly mapped to the programmable tributary slot group frame.

In an optional implementation, the transport requirement of each service includes a service type of the service; and the separately mapping the M services to at least one tributary slot of the programmable tributary slot group frame includes: if the M services include K services whose service type is a packet service, aggregating, into one integral service, the K services whose service type is a packet service, where a quantity of tributary slots that the integral service needs to occupy is the sum of quantities of tributary slots separately occupied by the K services whose service type is a packet service, and K≥2; and for each service, mapping, based on a quantity of tributary slots that a current service needs to occupy, the current service to a corresponding subcontainer included in the programmable tributary slot group frame, where the programmable tributary slot group frame includes M* subcontainers obtained after division performed according to M* services, M*=M−K+1, an $i^{th}$ subcontainer is corresponding to an $i^{th}$ service, the $i^{th}$ subcontainer includes $n_i$ tributary slots that the $i^{th}$ service needs to occupy, and $n_1+n_2+ \ldots +n_i+ \ldots +n_{M*} \leq n$.

Therefore, according to the method provided in this embodiment of the present disclosure, an occupied tributary slot is flexibly adjusted according to the service type, so as to improve bandwidth utilization.

In an optional implementation, the mapping, to a payload area of the variable optical payload unit based on the frame structure of the programmable tributary slot group frame, the at least one payload tributary slot group frame to which the M services are mapped includes: when the variable optical payload unit is the OPUflex, for each programmable tributary slot group frame, successively mapping, to r1 rows of a payload area of the OPUflex based on a frame structure of a programmable tributary slot group frame corresponding to the OPUflex, N1 code blocks that are in the current programmable tributary slot group frame and whose preset code block granularity is s1 bytes, where r1=N1*s1/3808, and each row of the payload area of the OPUflex includes 3808/s1 code blocks whose preset code block granularity is s1 bytes.

In an optional implementation, the mapping, to a payload area of the variable optical payload unit based on the frame structure of the programmable tributary slot group frame, the at least one programmable tributary slot group frame to which the M services are mapped includes: when the variable optical payload unit is the OPUKm, for each payload tributary slot group frame, successively mapping, to r2 rows of a payload area of the OPUKm based on a frame structure of a programmable tributary slot group frame corresponding to the OPUKm, N2 code blocks that are in the current programmable tributary slot group frame and whose preset code block granularity is s2 bytes, where r2=N2*s2/(3808*m), and each row of the payload area of the OPUKm includes 3808*m/s2 code blocks whose preset code block granularity is s2 bytes.

In an optional implementation, before the adding, to an overhead area of the variable optical payload unit, overhead information required to transport the M services, the method further includes: generating mapping overhead information for each service; and the adding, to an overhead area of the variable optical payload unit, overhead information required to transport the M services includes: adding a payload structure identifier PSI[0] at a first preset location in the overhead area of the variable optical payload unit, where the PSI[0] carries a payload type PT overhead value and is corresponding to a multiframe alignment signal MFAS=0, the PT overhead value is a first preset value, and the first preset value is used to indicate that the variable optical payload unit carries a plurality of services; adding a PSI[1], where the PSI[1] carries n and is corresponding to an MFAS=1; and adding a PSI[2] to a PSI[n+1], where the PSI[2] to the PSI[n+1] are respectively corresponding to an MFAS=2 to an MFAS=n+1, and are used to indicate an allocation and occupation status of each tributary slot, a PSI[j] is corresponding to an MFAS=j, is corresponding to a tributary slot (j−1) in the programmable tributary slot group frame, and is used to indicate an allocation and occupation status of the tributary slot (j−1), and 2≤j≤n+1; and adding an optical payload unit multiframe identifier OMFI at a second preset location in the overhead area of the variable optical payload unit, where a value of the OMFI is 0 to n−1, when the value of the OMFI is k, it indicates that a tributary slot overhead added at a third preset location in the overhead area of the variable optical payload unit is a tributary slot overhead of a tributary slot (k+1) in the programmable tributary slot group frame, 0≤k≤n−1, and the tributary slot overhead is used to store the mapping overhead information according to a preset rule.

Therefore, the method provided in this embodiment of the present disclosure can be compatible with an existing frame structure and an existing overhead monitoring mechanism.

In an optional implementation, the PSI[j] includes an occupation indication field and a service indication field, the occupation indication field is used to indicate whether the tributary slot (j−1) is occupied, and the service indication field is used to indicate a service identifier of a service carried by the tributary slot (j−1) when the tributary slot (j−1) is occupied.

In an optional implementation, the preset rule is: Mapping overhead information for a $t^{th}$ service is stored in a tributary slot overhead corresponding to a first tributary slot or a tributary slot overhead corresponding to a last tributary slot in a $t^{th}$ subcontainer corresponding to the $t^{th}$ service, 1≤t≤M, and the $t^{th}$ service is any one of the M services.

According to a second aspect, a multi-service receiving method includes: obtaining a variable optical payload unit through parsing; extracting overhead information from an overhead area of the variable optical payload unit, and determining a demapping procedure for the variable optical payload unit based on the overhead information, where the demapping procedure is used to obtain M services from the variable optical payload unit through demapping by using a programmable tributary slot group frame, the programmable tributary slot group frame is a tributary slot set used to meet transport requirements respectively corresponding to the M services, and M≥2; and obtaining the M services from a payload area of the variable optical payload unit through demapping according to the demapping procedure.

In an optional implementation, the demapping procedure includes a quantity of tributary slots included in the programmable tributary slot group frame, a frame structure of the programmable tributary slot group frame, and a quantity of tributary slots occupied by each of the M services; and the extracting overhead information from an overhead area of the variable optical payload unit, and determining a demapping procedure for the variable optical payload unit based on the overhead information includes: determining, based on the overhead information, a quantity n of tributary slots included in the programmable tributary slot group frame and the quantity of tributary slots occupied by each service, where n≥1; and determining the frame structure of the programmable tributary slot group frame based on the quantity n of tributary slots included in the programmable tributary slot group frame.

In an optional implementation, the determining, based on the overhead information, a quantity n of tributary slots included in the programmable tributary slot group frame and the quantity of tributary slots occupied by each service includes: extracting a PSI[0] at a first preset location in the overhead area of the variable optical payload unit, and identifying a PT overhead value carried by the PSI[0], where the PT overhead value is a first preset value, and the first preset value is used to indicate that the variable optical payload unit carries a plurality of services; extracting a PSI[1], and identifying n carried by the PSI[1], where n is used to indicate the quantity of tributary slots included in the programmable tributary slot group frame; and extracting a PSI[2] to a PSI[n+1], and identifying the PSI[2] to the PSI[n+1], where the PSI[2] to the PSI[n+1] are used to indicate an allocation and occupation status of each tributary slot, determine that the variable optical payload unit carries the M services, and determine the quantity of tributary slots occupied by each service, a PSI[j] is corresponding to a tributary slot (j−1) in the programmable tributary slot group frame, and is used to indicate an allocation and occupation status of the tributary slot (j−1), and 2≤j≤n+1.

In an optional implementation, the PSI[j] includes an occupation indication field and a service indication field, the occupation indication field is used to indicate whether the tributary slot (j−1) is occupied, and the service indication field is used to indicate a service identifier of a service carried by the tributary slot (j−1) when the tributary slot (j−1) is occupied.

In an optional implementation, the frame structure of the programmable tributary slot group frame is: When the variable optical payload unit is an OPUflex, the programmable tributary slot group frame includes N1 code blocks whose preset code block granularity is s1 bytes, N1 is a common multiple of 3808/s1 and n, and a rate of the programmable tributary slot group frame is n times a tributary slot rate.

In an optional implementation, N1 is the least common multiple of 3808/s1 and n.

In an optional implementation, the frame structure of the programmable tributary slot group frame is: When the variable optical payload unit is an OPUKm, the programmable tributary slot group frame includes N2 code blocks whose preset code block granularity is s2 bytes, N2 is a common multiple of 3808*m/s2 and n, m is a quantity of OPU instances included in the OPUKm, and a rate of the programmable tributary slot group frame is n times a tributary slot rate.

In an optional implementation, N2 is the least common multiple of 3808*m/s2 and n.

In an optional implementation, the obtaining the M services from a payload area of the variable optical payload unit through demapping according to the demapping procedure includes: obtaining at least one programmable tributary slot group frame from the payload area of the variable optical payload unit through demapping based on the frame structure of the programmable tributary slot group frame; and obtaining M services from each programmable tributary slot group frame through demapping based on the quantity of tributary slots occupied by each service.

In an optional implementation, the obtaining at least one programmable tributary slot group frame from the payload area of the variable optical payload unit through demapping based on the frame structure of the programmable tributary slot group frame includes: when the variable optical payload unit is an OPUflex, obtaining one programmable tributary slot group frame from every r1 rows of the payload area of the variable optical payload unit through demapping based on a frame structure of a programmable tributary slot group frame corresponding to the OPUflex, where r1=N1*s1/3808, and each row of a payload area of the OPUflex includes 3808/s1 code blocks whose preset code block granularity is s1 bytes.

In an optional implementation, the obtaining at least one programmable tributary slot group frame from the payload area of the variable optical payload unit through demapping based on the frame structure of the programmable tributary slot group frame includes: when the variable optical payload unit is an OPUKm, obtaining one programmable tributary slot group frame from every r2 rows of the payload area of the variable optical payload unit through demapping based on a frame structure of a programmable tributary slot group frame corresponding to the OPUKm, where r2=N2*s2/(3808*m), and each row of a payload area of the OPUKm includes 3808*m/s2 code blocks whose preset code block granularity is s2 bytes.

In an optional implementation, the extracting overhead information from an overhead area of the variable optical payload unit further includes: extracting a tributary slot overhead of each tributary slot, and identifying, according to a preset rule, mapping overhead information respectively corresponding to the M services; and the obtaining M services from each programmable tributary slot group frame through demapping based on the quantity of tributary slots occupied by each service includes: for each programmable tributary slot group frame, obtaining, from the current programmable tributary slot group frame through demapping based on the quantity of tributary slots occupied by each service, M subcontainers respectively corresponding to the M services, where an $i^{th}$ subcontainer is corresponding to an $i^{th}$ service, the $i^{th}$ subcontainer includes $n_i$ tributary slots that the $i^{th}$ service needs to occupy, and $n_1+n_2+ \ldots + n_i+ \ldots +n_M \leq n$; and respectively obtaining the M services from the M subcontainers through demapping based on the M subcontainers respectively corresponding to the M services and the mapping overhead information respectively corresponding to the M services.

In an optional implementation, the preset rule is: Mapping overhead information for a $t^{th}$ service is stored in a tributary slot overhead corresponding to a first tributary slot or a tributary slot overhead corresponding to a last tributary slot in a $t^{th}$ subcontainer corresponding to the $t^{th}$ service, $1 \leq t \leq M$, and the $t^{th}$ service is any one of the M services.

According to a third aspect, a multi-service transport apparatus includes: an obtaining unit, configured to obtain mapping transport control information of M services, where mapping transport control information of each service carries a transport requirement of the service, and M≥2; and a processing unit, configured to: determine a mapping procedure for the M services based on the mapping transport control information of the M services, where the mapping procedure is used to map the M services to a variable optical payload unit by using a programmable tributary slot group frame, and the programmable tributary slot group frame is a tributary slot set used to meet transport requirements respectively corresponding to the M services; and map the M services to the variable optical payload unit according to the mapping procedure.

In an optional implementation, the transport requirement of each service includes a traffic volume required by the service; the mapping procedure includes at least: a quantity of tributary slots included in the programmable tributary slot group frame, a tributary slot rate, a frame structure of the programmable tributary slot group frame, and a quantity of tributary slots that each of the M services needs to occupy; and when determining the mapping procedure for the M services based on the mapping transport control information of the M services, the processing unit is configured to: determine, based on traffic volumes respectively corresponding to the M services, a quantity n of tributary slots included in the programmable tributary slot group frame and the tributary slot rate; determine the frame structure of the programmable tributary slot group frame based on the quantity n of tributary slots included in the programmable tributary slot group frame; and determine, based on the traffic volumes respectively corresponding to the M services and the tributary slot rate, the quantity of tributary slots that each service needs to occupy.

In an optional implementation, when determining, based on the traffic volumes respectively corresponding to the M services, the quantity n of tributary slots included in the payload tributary slot group frame and the tributary slot rate, the processing unit is configured to: calculate a proportional relationship for the traffic volumes of the M services based on the traffic volumes respectively corresponding to the M services; and determine, based on the traffic volumes respectively corresponding to the M services and the proportional relationship, the quantity n of tributary slots included in the programmable tributary slot group frame and the tributary slot rate.

In an optional implementation, the frame structure of the programmable tributary slot group frame is: When the variable optical payload unit is an OPUflex, the programmable tributary slot group frame includes N1 code blocks whose preset code block granularity is s1 bytes, N1 is a common multiple of 3808/s1 and n, a rate of the programmable tributary slot group frame is n times the tributary slot rate, and a rate of the variable optical payload unit OPUflex is (239/238)*n times the tributary slot rate.

In an optional implementation, N1 is the least common multiple of 3808/s1 and n.

In an optional implementation, the frame structure of the programmable tributary slot group frame is: When the variable optical payload unit is an OPUKm, the programmable tributary slot group frame includes N2 code blocks whose preset code block granularity is s2 bytes, N2 is a common multiple of 3808*m/s2 and n, m is a quantity of OPU instances included in the OPUKm, a rate of the programmable tributary slot group frame is n times the tributary slot rate, and a rate of the variable optical payload unit OPUKm is (239/238)*n times the tributary slot rate.

In an optional implementation, N2 is the least common multiple of 3808*m/s2 and n.

In an optional implementation, when mapping the M services to the variable optical payload unit according to the mapping procedure, the processing unit is configured to: separately map the M services to at least one tributary slot of the programmable tributary slot group frame based on the quantity of tributary slots that each service needs to occupy, to obtain at least one programmable tributary slot group frame to which the M services are mapped; map, to a payload area of the variable optical payload unit based on the frame structure of the programmable tributary slot group frame, the at least one programmable tributary slot group frame to which the M services are mapped; and add, to an overhead area of the variable optical payload unit, overhead information required to transport the M services.

In an optional implementation, when separately mapping the M services to the at least one tributary slot of the programmable tributary slot group frame based on the quantity of tributary slots that each service needs to occupy, the processing unit is configured to: for each service, map, based on a quantity of tributary slots that a current service needs to occupy, the current service to a corresponding subcontainer included in the programmable tributary slot group frame, where the programmable tributary slot group frame includes M subcontainers obtained after division performed according to the M services, an $i^{th}$ subcontainer is corresponding to an $i^{th}$ service, the $i^{th}$ subcontainer includes $n_i$ tributary slots that the $i^{th}$ service needs to occupy, and $n_1+n_2+\ldots+n_i+\ldots+n_M \leq n$.

In an optional implementation, the transport requirement of each service includes a service type of the service; when separately mapping the M services to the at least one tributary slot of the programmable tributary slot group frame, the processing unit is configured to: if the M services include K services whose service type is a packet service, aggregate, into one integral service, the K services whose service type is a packet service, where a quantity of tributary slots that the integral service needs to occupy is the sum of quantities of tributary slots separately occupied by the K services whose service type is a packet service, and $K \geq 2$; and for each service, map, based on a quantity of tributary slots that a current service needs to occupy, the current service to a corresponding subcontainer included in the programmable tributary slot group frame, where the programmable tributary slot group frame includes M* subcontainers obtained after division performed according to M* services, M*=M−K+1, an $i^{th}$ subcontainer is corresponding to an $i^{th}$ service, the $i^{th}$ subcontainer includes $n_i$ tributary slots that the $i^{th}$ service needs to occupy, and $n_1+n_2+\ldots+n_i+\ldots+n_{M^*} \leq n$.

In an optional implementation, when mapping, to the payload area of the variable optical payload unit based on the frame structure of the programmable tributary slot group frame, the at least one payload tributary slot group frame to which the M services are mapped, the processing unit is configured to: when the variable optical payload unit is the OPUflex, for each programmable tributary slot group frame, successively map, to r1 rows of a payload area of the OPUflex based on a frame structure of a programmable tributary slot group frame corresponding to the OPUflex, N1 code blocks that are in the current programmable tributary slot group frame and whose preset code block granularity is s1 bytes, where r1=N1*s1/3808, and each row of the payload area of the OPUflex includes 3808/s1 code blocks whose preset code block granularity is s1 bytes.

In an optional implementation, when mapping, to the payload area of the variable optical payload unit based on the frame structure of the programmable tributary slot group frame, the at least one programmable tributary slot group frame to which the M services are mapped, the processing unit is configured to: when the variable optical payload unit is the OPUKm, for each payload tributary slot group frame, successively map, to r2 rows of a payload area of the OPUKm based on a frame structure of a programmable tributary slot group frame corresponding to the OPUKm, N2 code blocks that are in the current programmable tributary slot group frame and whose preset code block granularity is s2 bytes, where r2=N2*s2/(3808*m), and each row of the payload area of the OPUKm includes 3808*m/s2 code blocks whose preset code block granularity is s2 bytes.

In an optional implementation, before adding, to the overhead area of the variable optical payload unit, the overhead information required to transport the M services, the processing unit is further configured to: generate mapping overhead information for each service; and when adding, to the overhead area of the variable optical payload unit, the overhead information required to transport the M services, the processing unit is configured to: add a payload structure identifier PSI[0] at a first preset location in the overhead area of the variable optical payload unit, where the PSI[0] carries a payload type PT overhead value and is corresponding to a multiframe alignment signal MFAS=0, the PT overhead value is a first preset value, and the first preset value is used to indicate that the variable optical payload unit carries a plurality of services; add a PSI[1], where the PSI[1] carries n and is corresponding to an MFAS=1; and add a PSI[2] to a PSI[n+1], where the PSI[2] to the PSI[n+1] are respectively corresponding to an MFAS=2 to an MFAS=n+1, and are used to indicate an allocation and occupation status of each tributary slot, a PSI[j] is corresponding to an MFAS=j, is corresponding to a tributary slot (j−1) in the programmable tributary slot group frame, and is used to indicate an allocation and occupation status of the tributary slot (j−1), and $2 \leq j \leq n+1$; and add an optical payload unit multiframe identifier OMFI at a second preset location in the overhead area of the variable optical payload unit, where a value of the OMFI is 0 to n−1, when the value of the OMFI is k, it indicates that a tributary slot overhead added at a third preset location in the overhead area of the variable optical payload unit is a tributary slot overhead of a tributary slot (k+1) in the programmable tributary slot group frame, $0 \leq k \leq n-1$, and the tributary slot overhead is used to store the mapping overhead information according to a preset rule.

In an optional implementation, the PSI[j] includes an occupation indication field and a service indication field, the occupation indication field is used to indicate whether the tributary slot (j−1) is occupied, and the service indication field is used to indicate a service identifier of a service carried by the tributary slot (j−1) when the tributary slot (j−1) is occupied.

In an optional implementation, the preset rule is: Mapping overhead information for a $t^{th}$ service is stored in a tributary slot overhead corresponding to a first tributary slot or a tributary slot overhead corresponding to a last tributary slot in a $t^{th}$ subcontainer corresponding to the $t^{th}$ service, $1 \leq t \leq M$, and the $t^{th}$ service is any one of the M services.

According to a fourth aspect, a multi-service receiving apparatus includes: a parsing unit, configured to obtain a variable optical payload unit through parsing; and a processing unit, configured to: extract overhead information from an overhead area of the variable optical payload unit, and determine a demapping procedure for the variable optical payload unit based on the overhead information, where the demapping procedure is used to obtain M services from the variable optical payload unit through demapping by using a programmable tributary slot group frame, the programmable tributary slot group frame is a tributary slot set used to meet transport requirements respectively corresponding to the M services, and $M \geq 2$; and obtain the M services from a payload area of the variable optical payload unit through demapping according to the demapping procedure.

In an optional implementation, the demapping procedure includes a quantity of tributary slots included in the programmable tributary slot group frame, a frame structure of the programmable tributary slot group frame, and a quantity of tributary slots occupied by each of the M services; and when extracting the overhead information from the overhead area of the variable optical payload unit, and determining the demapping procedure for the variable optical payload unit based on the overhead information, the processing unit is configured to: determine, based on the overhead information, a quantity n of tributary slots included in the programmable tributary slot group frame and the quantity of tributary slots occupied by each service, where $n \geq 1$; and determine the frame structure of the programmable tributary slot group frame based on the quantity n of tributary slots included in the programmable tributary slot group frame.

In an optional implementation, when determining, based on the overhead information, the quantity n of tributary slots included in the programmable tributary slot group frame and the quantity of tributary slots occupied by each service, the processing unit is configured to: extract a PSI[0] at a first preset location in the overhead area of the variable optical payload unit, and identify a PT overhead value carried by the PSI[0], where the PT overhead value is a first preset value, and the first preset value is used to indicate that the variable optical payload unit carries a plurality of services; extract a PSI[1], and identify n carried by the PSI[1], where n is used to indicate the quantity of tributary slots included in the programmable tributary slot group frame; and extract a PSI[2] to a PSI[n+1], and identify the PSI[2] to the PSI[n+1], where the PSI[2] to the PSI[n+1] are used to indicate an allocation and occupation status of each tributary slot, determine that the variable optical payload unit carries the M services, and determine the quantity of tributary slots occupied by each service, a PSI[j] is corresponding to a tributary slot (j−1) in the programmable tributary slot group frame, and is used to indicate an allocation and occupation status of the tributary slot (j−1), and $2 \leq j \leq n+1$.

In an optional implementation, the PSI[j] includes an occupation indication field and a service indication field, the occupation indication field is used to indicate whether the tributary slot (j−1) is occupied, and the service indication field is used to indicate a service identifier of a service carried by the tributary slot (j−1) when the tributary slot (j−1) is occupied.

In an optional implementation, the frame structure of the programmable tributary slot group frame is: When the variable optical payload unit is an OPUflex, the programmable tributary slot group frame includes N1 code blocks whose preset code block granularity is s1 bytes, N1 is a common multiple of 3808/s1 and n, and a rate of the programmable tributary slot group frame is n times a tributary slot rate.

In an optional implementation, N1 is the least common multiple of 3808/s1 and n.

In an optional implementation, the frame structure of the programmable tributary slot group frame is: When the variable optical payload unit is an OPUKm, the programmable tributary slot group frame includes N2 code blocks whose preset code block granularity is s2 bytes, N2 is a common multiple of 3808*m/s2 and n, m is a quantity of OPU instances included in the OPUKm, and a rate of the programmable tributary slot group frame is n times a tributary slot rate.

In an optional implementation, N2 is the least common multiple of 3808*m/s2 and n.

In an optional implementation, when obtaining the M services from the payload area of the variable optical payload unit through demapping according to the demapping procedure, the processing unit is configured to: obtain at least one programmable tributary slot group frame from the payload area of the variable optical payload unit through demapping based on the frame structure of the programmable tributary slot group frame; and obtain M services from each programmable tributary slot group frame through demapping based on the quantity of tributary slots occupied by each service.

In an optional implementation, when obtaining the at least one programmable tributary slot group frame from the payload area of the variable optical payload unit through demapping based on the frame structure of the programmable tributary slot group frame, the processing unit is configured to: when the variable optical payload unit is the OPUflex, obtain one programmable tributary slot group frame from every r1 rows of the payload area of the variable optical payload unit through demapping based on a frame structure of a programmable tributary slot group frame corresponding to the OPUflex, where r1=N1*s1/3808, and each row of a payload area of the OPUflex includes 3808/s1 code blocks whose preset code block granularity is s1 bytes.

In an optional implementation, when obtaining the at least one programmable tributary slot group frame from the payload area of the variable optical payload unit through demapping based on the frame structure of the programmable tributary slot group frame, the processing unit is configured to: when the variable optical payload unit is the OPUKm, obtain one programmable tributary slot group frame from every r2 rows of the payload area of the variable optical payload unit through demapping based on a frame structure of a programmable tributary slot group frame corresponding to the OPUKm, where r2=N2*s2/(3808*m), and each row of a payload area of the OPUKm includes 3808*m/s2 code blocks whose preset code block granularity is s2 bytes.

In an optional implementation, when extracting the overhead information from the overhead area of the variable optical payload unit, the processing unit is further configured to: extract a tributary slot overhead of each tributary slot, and identify, according to a preset rule, mapping overhead information respectively corresponding to the M services; and when obtaining the M services from each programmable tributary slot group frame through demapping based on the quantity of tributary slots occupied by each service, the processing unit is configured to: for each programmable tributary slot group frame, obtain, from the current programmable tributary slot group frame through demapping based on the quantity of tributary slots occupied by each service, M subcontainers respectively corresponding to the M services, where an $i^{th}$ subcontainer is corresponding to an $i^{th}$ service, the $i^{th}$ subcontainer includes $n_i$ tributary slots that the $i^{th}$ service needs to occupy, and $n_1+n_2+ \ldots +n_i+ \ldots +n_M \leq n$; and respectively obtain the M services from the M subcontainers through demapping based on the M subcontainers respectively corresponding to the M services and the mapping overhead information respectively corresponding to the M services.

In an optional implementation, the preset rule is: Mapping overhead information for a $t^{th}$ service is stored in a tributary slot overhead corresponding to a first tributary slot or a tributary slot overhead corresponding to a last tributary slot in a $t^{th}$ subcontainer corresponding to the $t^{th}$ service, $1 \leq t \leq M$, and the $t^{th}$ service is any one of the M services.

According to a fifth aspect, an embodiment of the present disclosure provides a multi-service transport device, including: a transceiver; a memory, configured to store an instruction; and a processor, separately connected to the transceiver and the memory, and configured to perform the following operations according to the instruction stored in the memory: obtaining mapping transport control information of M services by using the transceiver, where mapping transport control information of each service carries a transport requirement of the service, and $M \geq 2$; determining a mapping procedure for the M services based on the mapping transport control information of the M services, where the mapping procedure is used to map the M services to a variable optical payload unit by using a programmable tributary slot group frame, and the programmable tributary slot group frame is a tributary slot set used to meet transport requirements respectively corresponding to the M services;

and mapping the M services to the variable optical payload unit according to the mapping procedure.

According to a sixth aspect, an embodiment of the present disclosure provides a multi-service receiving device, including: a transceiver; a memory, configured to store an instruction; and a processor, separately connected to the transceiver and the memory, and configured to perform the following operations according to the instruction stored in the memory: obtaining a variable optical payload unit through parsing; extracting overhead information from an overhead area of the variable optical payload unit, and determining a demapping procedure for the variable optical payload unit based on the overhead information, where the demapping procedure is used to obtain M services from the variable optical payload unit through demapping by using a programmable tributary slot group frame, the programmable tributary slot group frame is used to meet transport requirements respectively corresponding to the M services, and M≥2; and obtaining the M services from a payload area of the variable optical payload unit through demapping according to the demapping procedure.

Beneficial effects of the embodiments of the present disclosure are as follows: The embodiments of the present disclosure provide the multi-service transport method, including: obtaining the mapping transport control information of the M services; determining the mapping procedure of the M services; and mapping the M services to the variable optical payload unit according to the mapping procedure, that is, mapping M client services to at least one tributary slot of a PTSG-n, and further mapping the PTSG-n to the variable optical payload unit. A transport solution is flexibly customized based on a transport requirement of a client service, so that the data plane becomes programmable. Mapping can be flexibly performed according to a requirement, implementing mixed bearing of services with a plurality of rates, and meeting a customized transport requirement of the client service. In addition, a rate of a bearer container can be flexibly changed, and tributary slots are divided flexibly, improving bandwidth utilization. The method is also compatible with an existing ODUflex frame structure and an existing overhead monitoring mechanism. In addition, the embodiments of the present disclosure further provide the multi-service receiving method. The multi-service receiving method is a reverse process of the multi-service transport method. After the variable optical payload unit is obtained through parsing, the demapping procedure is determined based on the overhead area of the variable optical payload unit, and the M services are obtained from the variable optical payload unit through demapping according to the demapping procedure. Therefore, the services with a plurality of rates can be carried in a mixed manner, and the customized transport requirement of the client service can be met.

DETAILED DESCRIPTION OF ILLUSTRATIVE EMBODIMENTS

The following describes embodiments of the present disclosure with reference to the accompanying drawings. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Embodiments of the present disclosure provide a multi-service transport and receiving method and apparatus, so as to resolve a problem that an ODUflex can be applied only to a single service and cannot implement customized mapping and transport of a plurality of services. The method and the apparatus are based on a same disclosure concept. The method and the apparatus have similar principles for resolving the problems. Therefore, for implementation of the apparatus and the method, reference may be made to each other, and details of repeated parts are not described.

Figure 3:
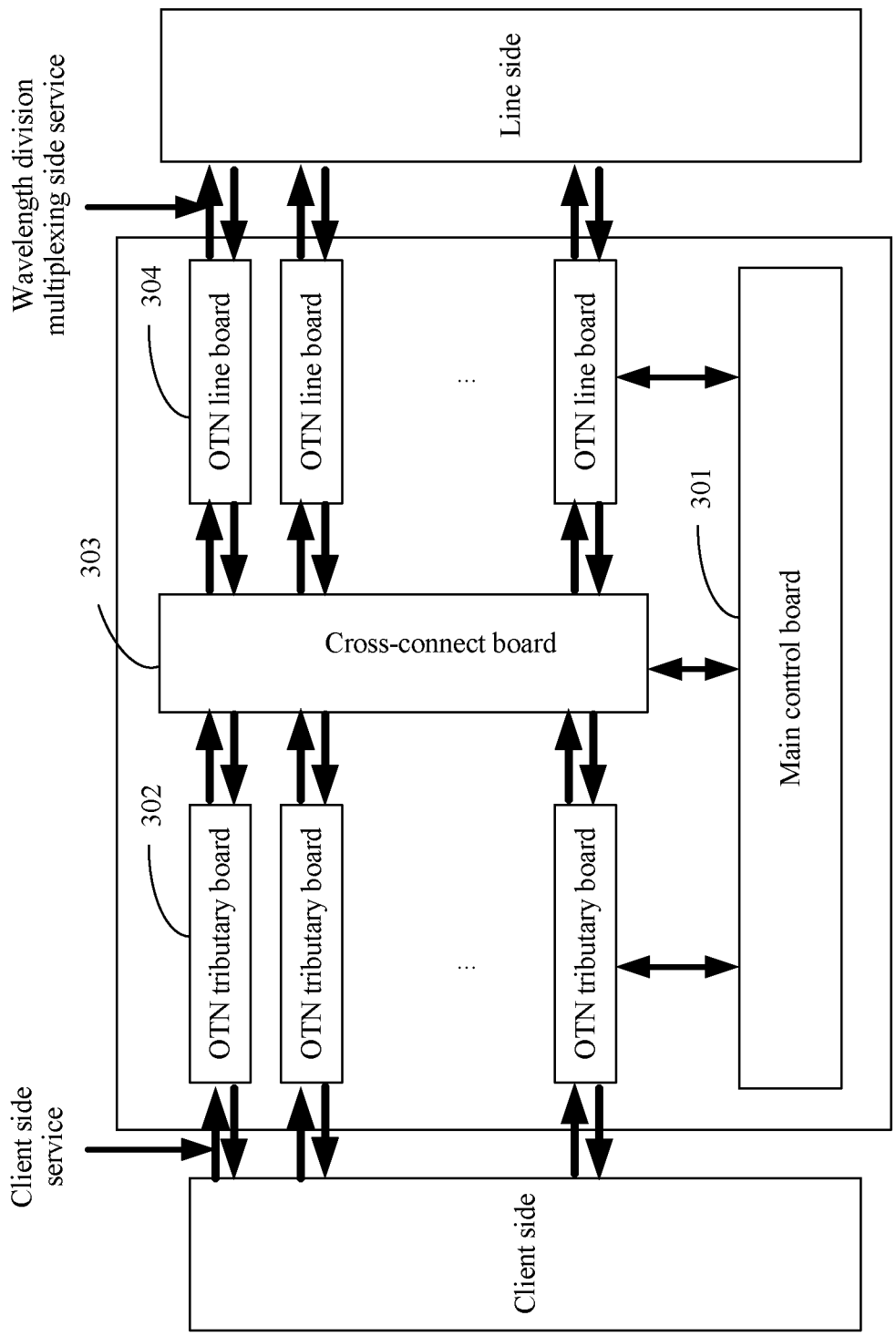
FIG. 3 is a schematic diagram of a hardware structure of an OTN device according to an embodiment of the present disclosure.

FIG. 3 is a schematic diagram of a hardware structure of an OTN (Optical Transport Network) device according to an embodiment of the present disclosure. As shown in FIG. 3, the OTN device includes a main control board 301, an OTN tributary board 302, a cross-connect board 303, and an OTN line board 304. A service transmission direction may be from a client side to a line side, or may be from a line side to a client side. A service sent or received by the client side is referred to as a client side service, and a service received or sent by the line side is referred to as a wavelength division multiplexing side service. Procedures of processing the services in the two directions are processes mutually reverse to each other. An example of transmission from the client side to the line side is used below for description.

The main control board 301 is connected to the OTN tributary board 302, the cross-connect board 303, and the OTN line board 304 directly or by using a bus, to control and manage the OTN tributary board 302, the cross-connect board 303, and the OTN line board 304.

The OTN tributary board 302 completes encapsulation and mapping on a client service. The client service includes a plurality of service types, such as an Asynchronous Transfer Mode (ATM) service, a Synchronous Digital Hierarchy (SDH) service, an Ethernet service, a Common Public Radio Interface (CPRI) service, and a storage service. Specifically, the OTN tributary board 302 is configured to receive a client service from the client side, encapsulate the received client service, map the client service to an ODU signal, and add corresponding OTN management and monitoring overheads. On the OTN tributary board 302, the ODU signal may be a lower order ODU signal, such as an ODU1, an ODU1, an ODU2, an ODU3, or an ODUflex. The OTN management and monitoring overheads may be ODU overheads. Different types of client services are encapsulated in different manners and are then mapped to different ODU signals.

The cross-connect board 303 completes a full cross-connection between the tributary board and the line board, and implements flexible cross grooming on the ODU signal. Specifically, the cross-connect board 303 may transmit an ODU signal from any tributary board to any line board, or transmit an OTU signal from any line board to any other line board, and may transmit a client signal from any tributary board to any other tributary board.

The OTN line board 304 generates an OTU signal by using an ODU signal and sends the OTU signal to the line side. Before generating the OTU signal by using the ODU signal, the OTN line board 304 may multiplex a plurality of lower order ODU signals to higher order ODU signals. Then, corresponding OTN management and monitoring overheads are added to the higher order ODU signals to generate OTU signals, and the OTU signals are sent to an optical transmission channel on the line side. On the OTN line board, the higher order ODU signals may be an ODU1, an ODU2, an ODU3, and an ODU4. The OTN management and monitoring overheads may be OTU overheads.

The main control board 301 may execute a preconfigured program code, to control any one or more of the OTN tributary board 302, the cross-connect board 303, or the OTN line board 304 to implement functions in this embodiment of the present disclosure. Main hardware devices corresponding to this embodiment of the present disclosure are the OTN tributary board 302 and the OTN line board 304.

In the following, the implementations of the present disclosure are described in detail with reference to the accompanying drawings.

Figure 4:
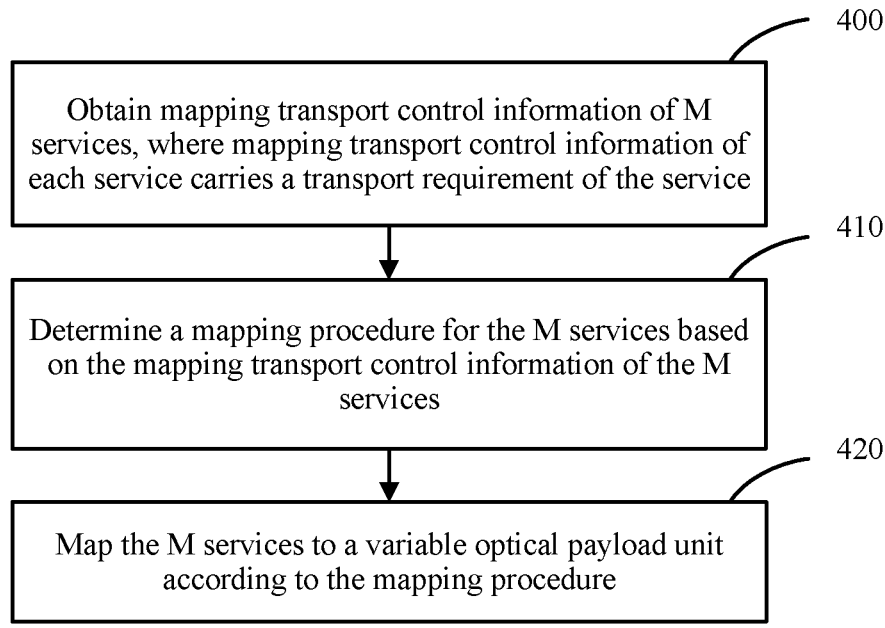
FIG. 4 is an overview flowchart of a multi-service transport method according to an embodiment of the present disclosure.

As shown in FIG. 4, a multi-service transport method includes the following steps.

Step 400: Obtain mapping transport control information of M services.

Mapping transport control information of each service carries a transport requirement of the service, and $M \geq 1$.

The transport requirement of each service herein includes a service type of the service, such as a CBR service or a PKT service, and may further include a parameter, for example, a traffic volume of the service.

Step 410: Determine a mapping procedure for the M services based on the mapping transport control information of the M services.

The mapping procedure is used to map the M services to a variable optical payload unit by using a programmable tributary slot group frame. The mapping procedure includes at least: a quantity of tributary slots included in the programmable tributary slot group frame, a tributary slot rate, a frame structure of the programmable tributary slot group frame, and a quantity of tributary slots that each of the M services needs to occupy. The programmable tributary slot group frame is a tributary slot set used to meet transport requirements respectively corresponding to the M services.

In this application file, a PTSG-n is used to represent a programmable tributary slot group frame (Programmable Tributary Slot Group-n). The programmable tributary slot group frame can also be referred to as a payload tributary slot group frame (Payload Tributary Slot Group-n).

A case of $M \geq 2$ is mainly discussed in this embodiment of the present disclosure, that is, a scenario of transporting and receiving a plurality of services. Certainly, when M=1, the method provided in this embodiment of the present disclosure can also be used for service transport and receiving, but a scenario of transporting and receiving one service is not an application scenario that is emphatically discussed in this embodiment of the present disclosure.

Step 420: Map the M services to a variable optical payload unit according to the mapping procedure.

For step 410, when the mapping procedure for the M services is determined based on the mapping transport control information of the M services, the following method may be used, but the present disclosure is not limited thereto.

The mapping transport control information corresponding to each service is used to request transmission of the service, and includes various types of attribute information of the service, such as a traffic volume and a service type of the service.

First, a quantity n of tributary slots included in the programmable tributary slot group frame and the tributary slot rate are determined based on traffic volumes respectively corresponding to the M services.

In example 1, a traffic volume of a first service is 3 Gbit/s, and a traffic volume of a second service is 2 Gbit/s. Therefore, a quantity of tributary slots may be set to 5, a tributary slot rate may be set to 1 Gbit/s, and the programmable tributary slot group frame is a PTSG-5.

Optionally, a proportional relationship for the traffic volumes of the M services is calculated based on the traffic volumes respectively corresponding to the M services, and the quantity n of tributary slots included in the programmable tributary slot group frame and the tributary slot rate are determined based on the traffic volumes respectively corresponding to the M services and the proportional relationship.

In example 2, a traffic volume of a first service is 1 Gbit/s, and a traffic volume of a second service is 1.8 Gbit/s. If a solution similar to the foregoing is still used, a quantity of tributary slots is set to 3, and a tributary slot rate is set to 1 Gbit/s, some resources are wasted for the second service. In this case, a proportional relationship between the traffic volume of the first service and the traffic volume of the second service may be obtained through calculation, that is, 5:9. The quantity of tributary slots is set to 14, the tributary slot rate is set to 0.2 Gbit/s, and the programmable tributary slot group frame is a PTSG-14. In this way, resources can be effectively used.

It should be known that the foregoing method is merely used as an optional solution, and a plurality of factors need to be considered comprehensively to determine the quantity n of tributary slots and the tributary slot rate.

Then, the quantity of tributary slots that each service needs to occupy is determined based on the traffic volumes respectively corresponding to the M services and the tributary slot rate.

In the foregoing example 1, the traffic volume of the first service is 3 Gbit/s, the traffic volume of the second service is 2 Gbit/s, the tributary slot rate is 1 Gbit/s, and the total quantity of tributary slots is 5. It can be obtained that a quantity of tributary slots that the first service needs to occupy is 3/1=3, and a quantity of tributary slots that the second service needs to occupy is 2/1=2.

In the foregoing example 2, the traffic volume of the first service is 1 Gbit/s, the traffic volume of the second service is 1.8 Gbit/s, the tributary slot rate is 0.2 Gbit/s, and the total quantity of tributary slots is 14. It can be obtained that a quantity of tributary slots that the first service needs to occupy is 1/0.2=5, and a quantity of tributary slots that the second service needs to occupy is 1.8/0.2=9.

Further, the frame structure of the programmable tributary slot group frame is determined based on the quantity n of tributary slots included in the programmable tributary slot group frame.

In this embodiment of the present disclosure, only an example in which the variable optical payload unit is an OPUflex or an OPUKm is used for description. Once persons skilled in the art learn of a basic inventive concept, other variations and modifications can be made to these embodiments, and the present disclosure is also intended to include these variations and modifications.

When the variable optical payload unit is the OPUflex, the frame structure of the programmable tributary slot group frame is: The programmable tributary slot group frame includes N1 code blocks whose preset code block granularity is s1 bytes, N1 is a common multiple of 3808/s1 and n, a rate of the programmable tributary slot group frame is n times the tributary slot rate, and a rate of the variable optical payload unit OPUflex is (239/238)*n times the tributary slot rate.

A programmable tributary slot group is constructed, and the programmable payload tributary slot group includes n tributary slots. That is, an OPUflex including n tributary slots is constructed. Therefore, if a tributary slot rate of a current PTSG-n is Rts, a rate of the OPUflex is (239/238)*n*Rts.

Optionally, N1 is the least common multiple of 3808/s1 and n.

It should be known that, generally, s1 can be exactly divided by 3808. When s1 cannot be exactly divided by 3808, when N1 is determined, a common multiple of n and a value that is obtained by rounding 3808/s1 is used as a value of N1. Ω mentioned below is similar to s1, and details are not described again.

Figure 1:
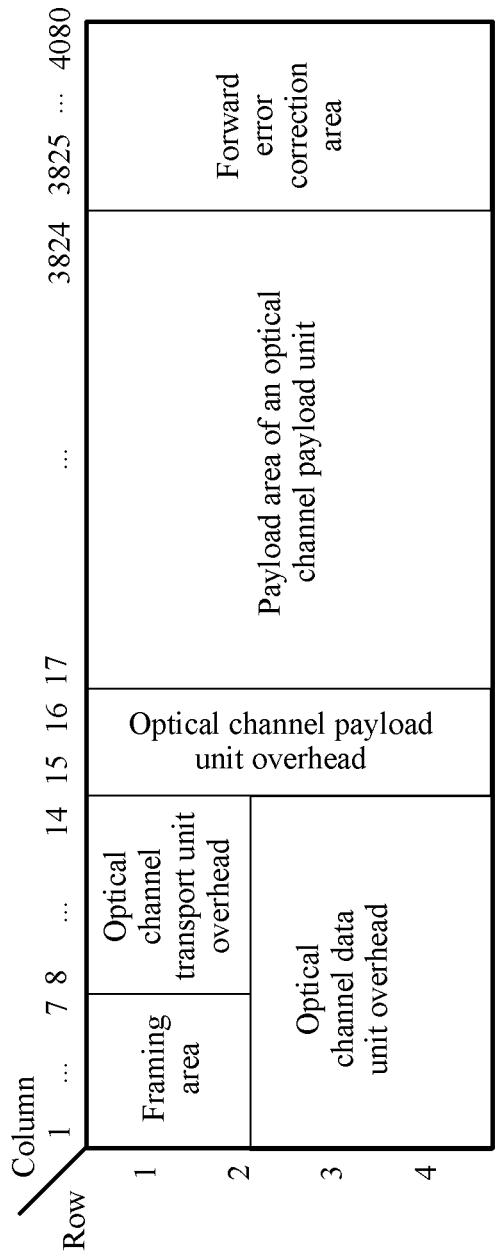
FIG. 1 is a schematic structural diagram of an OTN frame in the background of the present disclosure.
Figure 2:
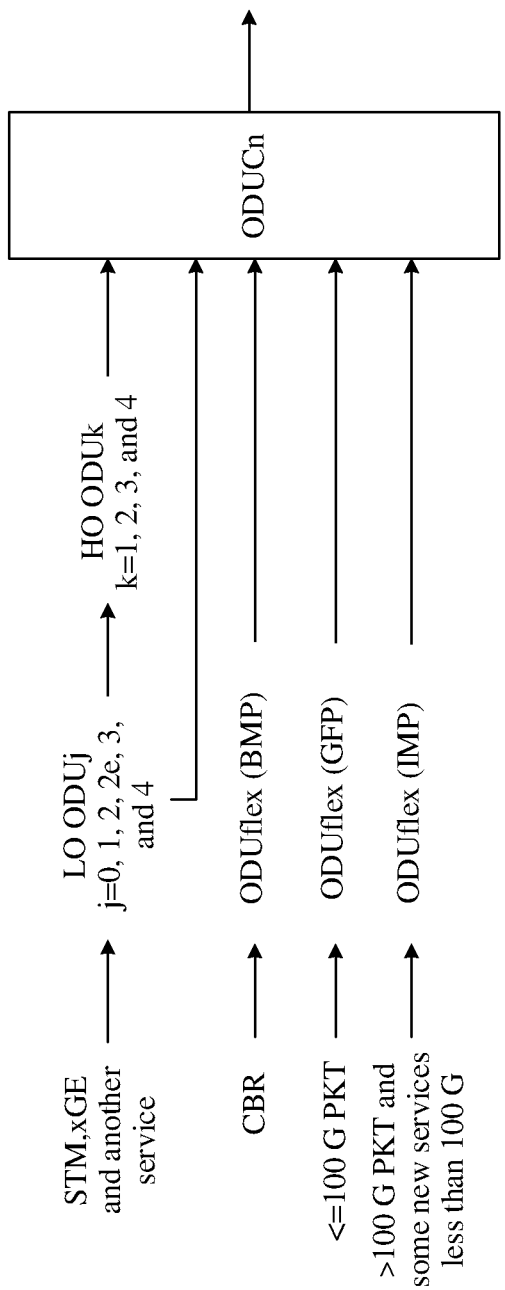
FIG. 2 is a schematic diagram of an existing solution for transporting different services in the background of the present disclosure.
Figure 5:
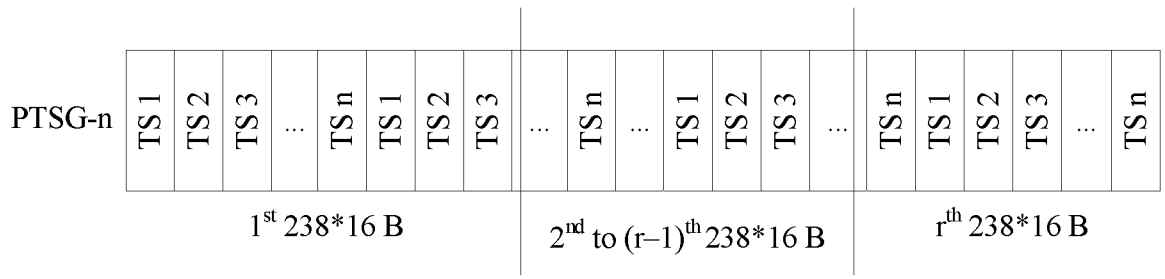
FIG. 5 is one of schematic structural diagrams of a PTSG-n according to an embodiment of the present disclosure.

As shown in FIG. 5, the PTSG-n includes n tributary slots from a TS1 to a TSn. A preset code block granularity being 16 B is used as an example in FIG. 5, and 16 B represents 16 bytes. In addition, another granularity such as 8 bytes, 4 bytes, or 66 bits can also be considered. The code block granularity is set by using an SDN (Software Defined Network, software defined network) controller. N=LCM (3808/16, n)=LCM (238, n), where 3808 is a quantity of bytes included in each row of a payload area of an OPU. As shown in FIG. 1, a quantity of bytes of the payload area is 3824−16=3808. A group 238×16 B that is separated from another group by a vertical line is placed in one row of a corresponding payload area, and placement can be performed in r=N/238 rows in total. How to map the PTSG-n to the OPUflex is described below in detail, and only a brief description is provided herein.

Therefore, a mapping procedure of a PTSG-n based frame structure in this embodiment of the present disclosure may also be referred to as a programmable mapping procedure, and can be compatible with an existing OPUflex frame structure and an existing overhead monitoring mechanism.

When the variable optical payload unit is an OPUKm, the frame structure of the programmable tributary slot group frame is: When the variable optical payload unit is the OPUKm, the programmable tributary slot group frame includes N2 code blocks whose preset code block granularity is s2 bytes, N2 is a common multiple of 3808*m/s2 and n, m is a quantity of OPU instances (OPU instance) included in the OPUKm, a rate of the programmable tributary slot group frame is n times the tributary slot rate, and a rate of the variable optical payload unit OPUKm is (239/238)*n times the tributary slot rate.

Optionally, N2 is the least common multiple of 3808*m/s2 and n.

Figure 6:
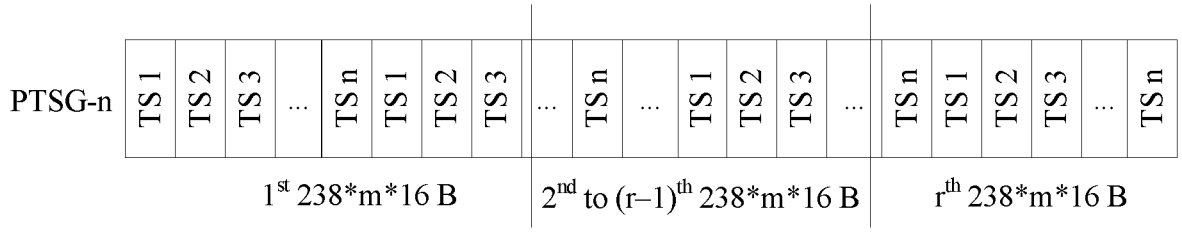
FIG. 6 is one of schematic structural diagrams of a PTSG-n according to an embodiment of the present disclosure.

As shown in FIG. 6, the PTSG-n includes n tributary slots from a TS 1 to a TS n, and a preset code block granularity being 16 B is used as an example in FIG. 6. N=LCM (3808*m/16, n)=LCM(238*m, n), where 3808*m is a quantity of bytes included in each row of a payload area of the OPUKm, a group of 238*m*16 B that is separated from another group by a vertical line is placed in one row of a corresponding payload area, and placement can be performed in r=N/(238*m) rows in total. How to map the PTSG-n to the OPUKm is described below in detail, and only a brief description is provided herein.

For step 420, the mapping the M services to the variable optical payload unit according to the mapping procedure needs to include the following steps:

First, separately map the M services to at least one tributary slot of the programmable tributary slot group frame based on the quantity of tributary slots that each service needs to occupy, to obtain at least one programmable tributary slot group frame to which the M services are mapped.

Optionally, the M services are separately mapped to at least one tributary slot of the programmable tributary slot group frame based on the quantity of tributary slots that each service needs to occupy, and specifically, for each service, the following step is performed: mapping, based on a quantity of tributary slots that each service needs to occupy, a current service to a corresponding subcontainer included in the programmable tributary slot group frame, where the programmable tributary slot group frame includes M subcontainers obtained after division performed according to the M services, an $i^{th}$ subcontainer is corresponding to an $i^{th}$ service, the $i^{th}$ subcontainer includes $n_i$ tributary slots that the $i^{th}$ service needs to occupy, and $n_1+n_2+\ldots+n_i+\ldots+n_M \leq n$.

For example, the M services are separately mapped to one or more tributary slots of the PTSG-n, that is, respectively mapped to subcontainers including one or more tributary slots of the PTSG-n. The subcontainers can be marked as a PTSG-$n_1$, a PTSG-$n_2$, ..., and a PTSG-$n_M$. The PTSG-$n_1$, the PTSG-$n_2$, ..., and the PTSG-$n_M$ are a part of the PTSG-n, and respectively include $n_1$, $n_2$, ..., and $n_M$ tributary slots. Specific mapping overhead information of the M services is generated.

Optionally, when the transport requirement of each service includes the service type of the service, the M services may be separately mapped to the at least one tributary slot of the programmable tributary slot group frame by using the following method: if the M services include K services whose service type is a packet service, aggregating, into one integral service, the K services whose service type is a packet service, where a quantity of tributary slots that the integral service needs to occupy is the sum of quantities of tributary slots separately occupied by the K services whose service type is a packet service, and K≥2.

In this case, for each service, the following step is performed: mapping, based on the quantity of tributary slots that each service needs to occupy, a current service to a corresponding subcontainer included in the programmable tributary slot group frame, where the programmable tributary slot group frame includes M* subcontainers obtained after division performed according to M* services, M*=M−K+1, an $i^{th}$ subcontainer is corresponding to an $i^{th}$ service, the $i^{th}$ subcontainer includes $n_i$ tributary slots that the $i^{th}$ service needs to occupy, and $n_1+n_2+ ... +n_i+ ... +n_M \leq n$.

For example, a service type of a first service is a CBR service, and a quantity of tributary slots that the first service needs to occupy is 2; a service type of a second service is a CBR service, and a quantity of tributary slots that the second service needs to occupy is 1; a service type of a third service is a PKT service, and a quantity of tributary slots that the third service needs to occupy is 3; a service type of a fourth service is a PKT service, and a quantity of tributary slots that the fourth service needs to occupy is 2. The first service may be mapped to a PTSG-2 by using a GMP. The second service may be mapped to a PTSG-1 by using the GMP. The third service and the fourth service are aggregated into one integral service, a quantity of tributary slots that the service obtained after the aggregation need to occupy is 2+3=5, and the service obtained after the aggregation may be mapped to a PTSG-5 by using an IMP or a GFP.

Therefore, aggregating packet services can improve transport bandwidth utilization.

Second, map, to a payload area of the variable optical payload unit based on the frame structure of the programmable tributary slot group frame, the at least one programmable tributary slot group frame to which the M services are mapped.

When the variable optical payload unit is the OPUflex, for each programmable tributary slot group frame, the following step is performed: successively mapping, to r1 rows of a payload area of the OPUflex based on a frame structure of a programmable tributary slot group frame corresponding to the OPUflex, N1 code blocks that are in the current programmable tributary slot group frame and whose preset code block granularity is s1 bytes, where r1=N1*s1/3808, and each row of the payload area of the OPUflex includes 3808/s1 code blocks whose preset code block granularity is s1 bytes.

Figure 7:
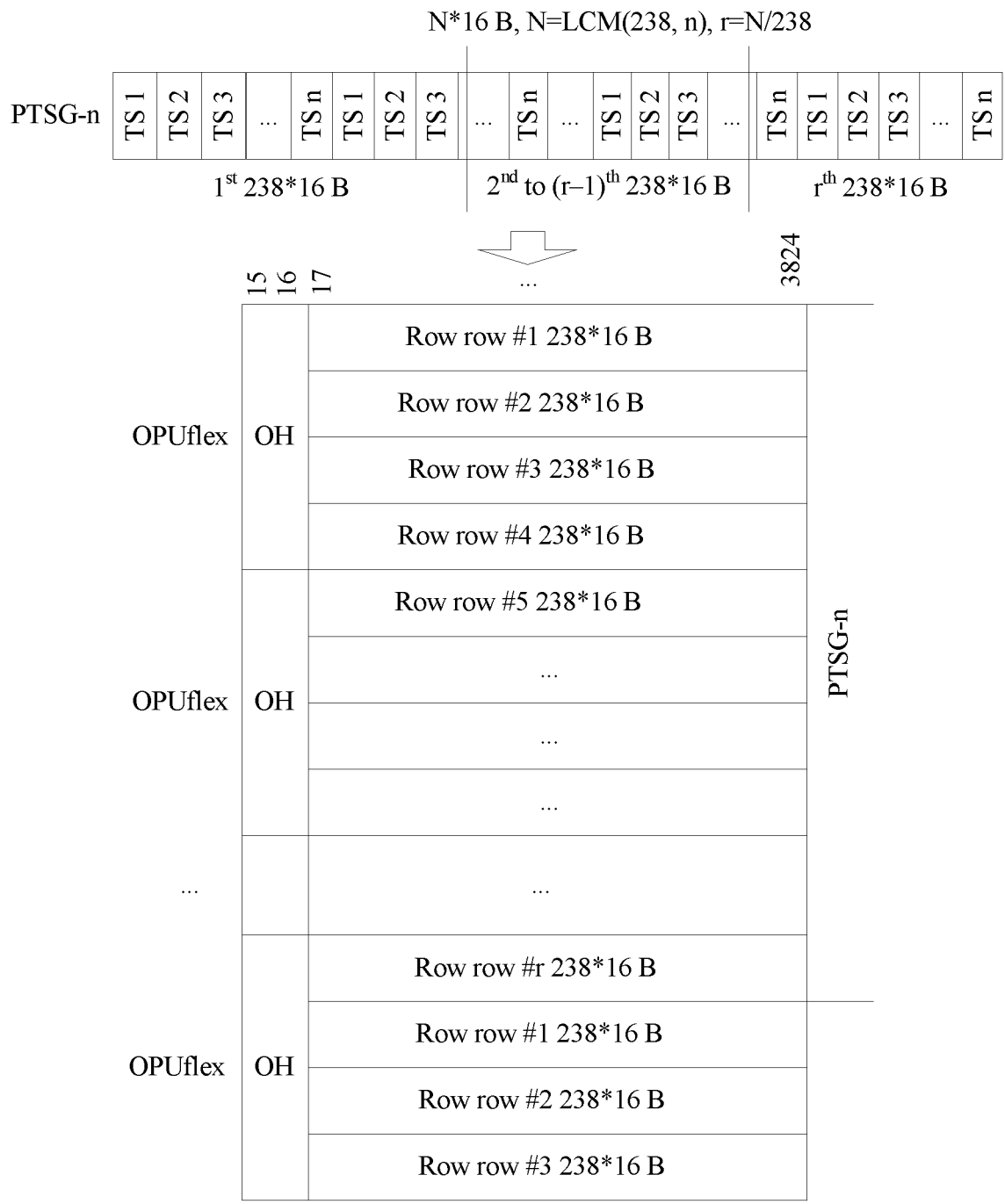
FIG. 7 is a schematic diagram of mapping a PTSG-n to a payload area of an OPUflex according to an embodiment of the present disclosure.

As shown in FIG. 7, the PTSG-n shown in FIG. 5 is mapped to the payload area of the OPUflex. One PTSG-n can be mapped to r rows of the payload area of the OPUflex, and r=N/238. A specific mapping manner may be bit synchronous mapping. As shown in FIG. 7, N 16-B code blocks of the PTSG-n are successively placed in the r rows of the payload area of the OPUflex from left to right and from top to bottom, each row of the payload area of the OPUflex includes 238 16-byte code blocks, and each 16-B code block of the PTSG-n is in a one-to-one correspondence to every 16 bytes in the payload area of the OPUflex. The PTSG-n frame exactly matches the r rows in the payload area of the OPUflex frame.

When the variable optical payload unit is the OPUKm, for each payload tributary slot group frame, the following step is performed: successively mapping, to r2 rows of a payload area of the OPUKm based on a frame structure of a programmable tributary slot group frame corresponding to the OPUKm, N2 code blocks that are in the current programmable tributary slot group frame and whose preset code block granularity is s2 bytes, where r2=N2*s2/(3808*m), and each row of the payload area of the OPUKm includes 3808*m/s2 code blocks whose preset code block granularity is s2 bytes.

Figure 8:
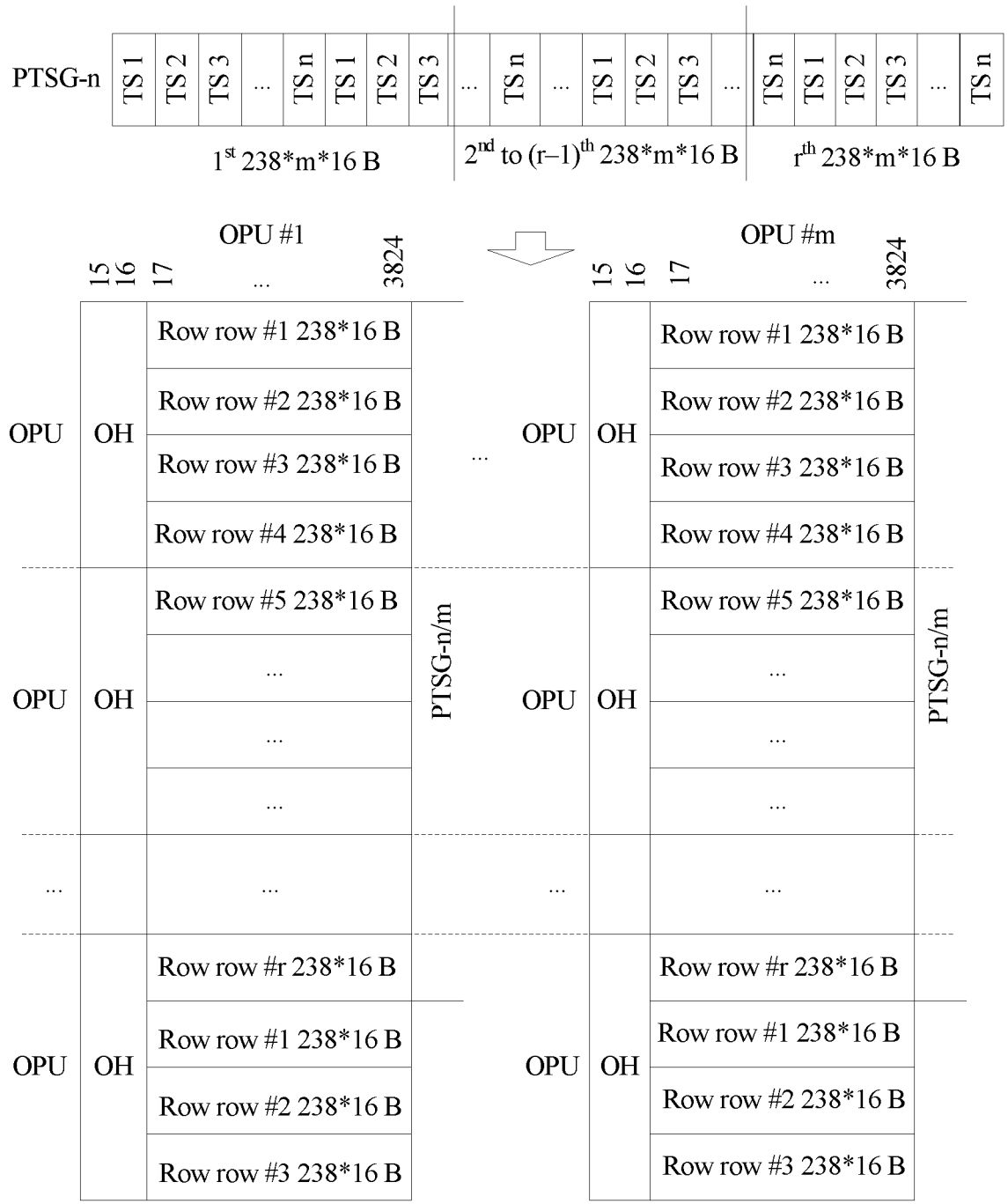
FIG. 8 is a schematic diagram of mapping a PTSG-n to a payload area of an OPUKm according to an embodiment of the present disclosure.

As shown in FIG. 8, the PTSG-n shown in FIG. 6 is mapped to the payload area of the OPUKm. 238*m is a quantity of 16-B code blocks included in one row of a payload area of an OPUKm frame. The OPUKm frame includes m OPU instances (marked as an OPU #1, an OPU #2, ..., and an OPU # m), and m is a quantity of OPU instances included in the variable optical payload unit OPUKm. Each OPU instance frame includes bytes in four rows and 3808 columns, and each row of the OPU instance includes 238 16-B code blocks. A specific mapping manner may be bit synchronous mapping. As shown in FIG. 7, N 16-B code blocks of the PTSG-n are successively placed in the m OPU instances from left to right, and are successively placed in r rows of the payload area of the OPUKm from top to bottom.

Third, add, to an overhead area of the variable optical payload unit, overhead information required to transport the M services.

Figure 9:
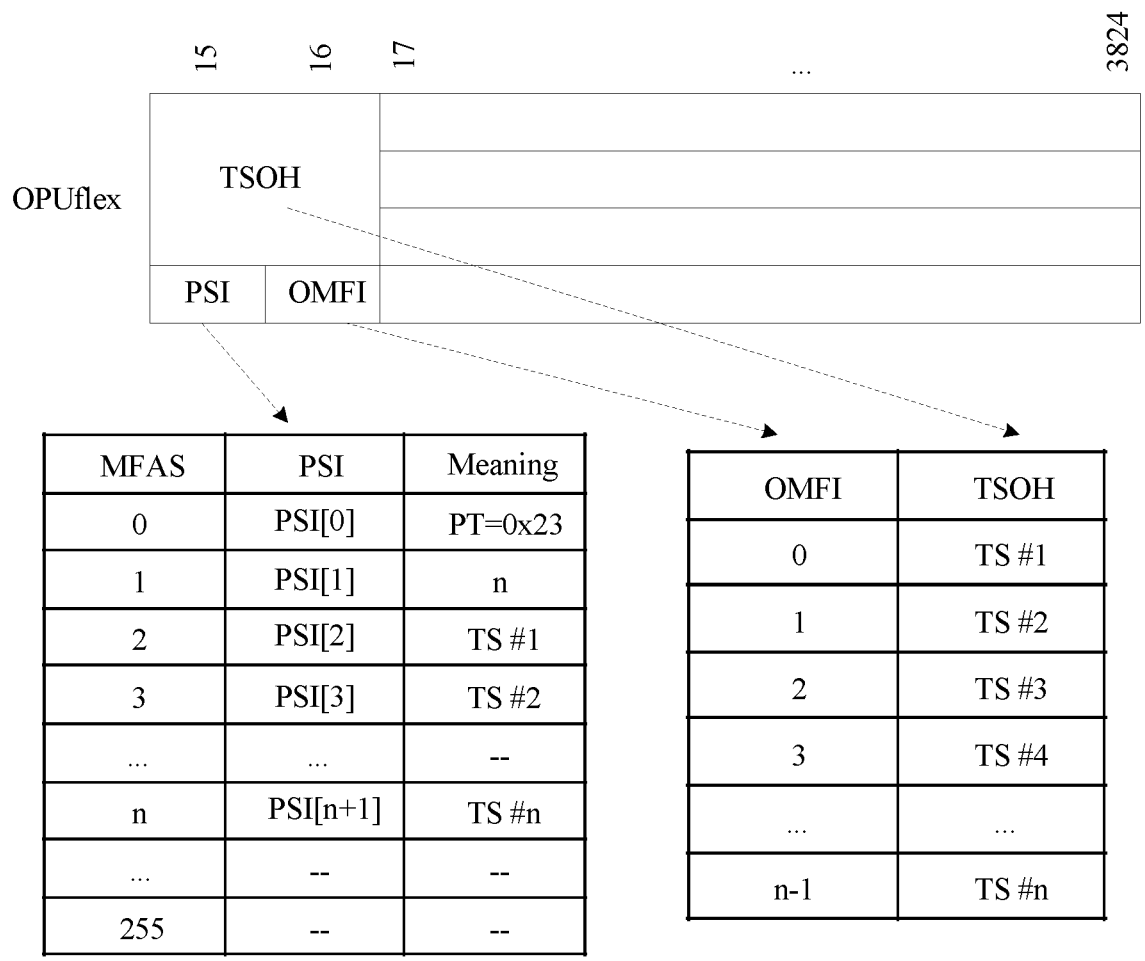
FIG. 9 is a schematic diagram of various types of overhead information of an overhead area of an OPUflex according to an embodiment of the present disclosure.

FIG. 9 is used as an example below for description. FIG. 9 shows various overhead information of an overhead area of the OPUflex.

(1) A payload structure identifier PSI[0] is added at a first preset location in the overhead area of the variable optical payload unit, where the PSI[0] carries a payload type PT overhead value, occupies 1 byte, and is corresponding to an multiframe alignment signal (MFAS)=0, the PT overhead value is a first preset value, and the first preset value is used to indicate that the variable optical payload unit carries a plurality of services.

Specifically, the first preset location herein may be in the fourth row and the 15th row of the OPUflex frame, or in the fourth row and the 15th row in an overhead area of each OPU instance. The first preset value herein may be PT=0× 23.

(2) A PSI[1] is added, where the PSI[1] carries n, is corresponding to an MFAS=1, and occupies 1 byte.

(3) A PSI[2] to a PSI[n+1] are added, and occupy n bytes in total, where the PSI[2] to the PSI[n+1] are respectively corresponding to an MFAS=2 to an MFAS=n+1, and are used to indicate an allocation and occupation status of each tributary slot; a PSI[j] is corresponding to an MFAS=j, is corresponding to a tributary slot (j−1) in the programmable tributary slot group frame, and is used to indicate an allocation and occupation status of the tributary slot (j−1); and 2≤j≤n+1.

Figure 10:
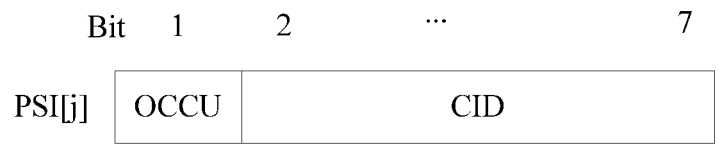
FIG. 10 is a schematic diagram of a specific structure of a PSI[j] according to an embodiment of the present disclosure.

As shown in FIG. 10, the PSI[j] includes an occupation indication field (OCCU) and a Client Identifier (CID).

The OCCU occupies 1 bit, and is used to indicate whether the tributary slot (j−1) is occupied. 0 indicates idle, and 1 indicates occupied.

The CID occupies 7 bits, and is used to indicate a service identifier of a service carried by the tributary slot (j−1) when the tributary slot (j−1) is occupied.

(4) An optical payload unit multiframe identifier OMFI (OPU MultiFrame Identifier, optical payload unit multiframe identifier) is added at a second preset location in the overhead area of the variable optical payload unit, where a value of the OMFI is 0 to n−1; when the value of the OMFI is k, it indicates that a tributary slot overhead added at a third preset location in the overhead area of the variable optical payload unit is a tributary slot overhead of a tributary slot (k+1) in the programmable tributary slot group frame; 0≤k≤n−1; and the tributary slot overhead is used to store the mapping overhead information according to a preset rule.

The second preset location herein is in the fourth row and the $16^{th}$ column of the OPUflex frame, or in the fourth row and the $16^{th}$ column of the overhead area of each OPU instance, and the OMFI occupies 1 byte. The third preset location is in the first to third rows and the $15^{th}$ and $16^{th}$ columns of the OPUflex frame, or in the first to third rows and the $15^{th}$ and $16^{th}$ columns of the overhead area of each OPU instance, and a tributary slot overhead occupies 6 bytes in total.

Specifically, before the overhead information required to transport the M services is added to the overhead area of the variable optical payload unit, mapping overhead information for each service further needs to be generated. Generally, the mapping overhead information for each service is generated after the service is mapped to at least one tributary slot of the PTSG-n.

Optionally, the preset rule is: Mapping overhead information for a $t^{th}$ service is stored in a tributary slot overhead corresponding to a first tributary slot or a tributary slot overhead corresponding to a last tributary slot in a $t^{th}$ subcontainer corresponding to the $t^{th}$ service, i≤t≤M, and the $t^{th}$ service is any one of the M services.

For example, if a first service occupies a tributary slot 1 to a tributary slot 3, mapping overhead information for the first service may be selectively stored in a tributary slot overhead corresponding to the tributary slot 1 or a tributary slot overhead corresponding to the tributary slot 3. If the mapping overhead information of the first service is placed in the tributary slot overhead corresponding to the tributary slot 1, tributary slot overheads respectively corresponding to the tributary slot 2 and the tributary slot 3 are reserved.

Figure 11:
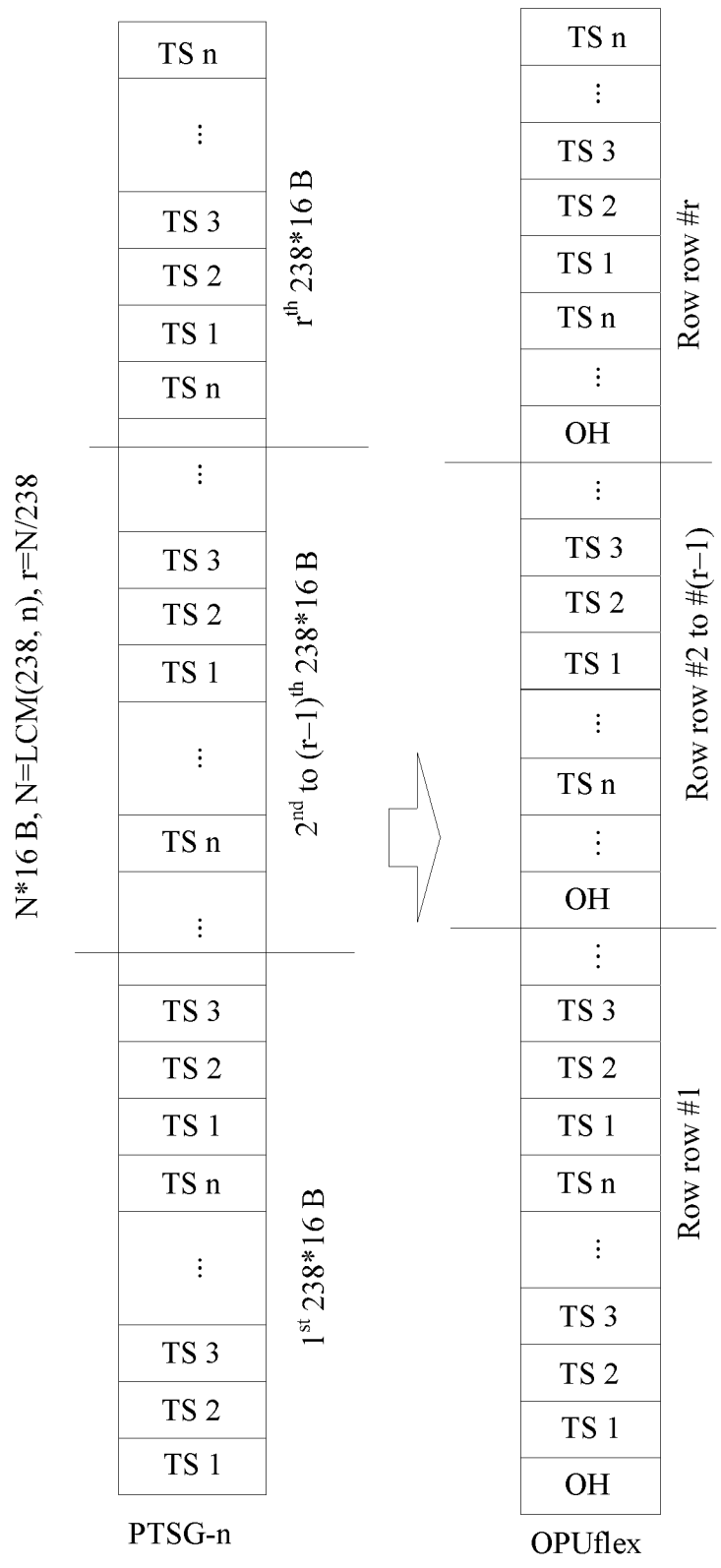
FIG. 11 is a schematic diagram of an equivalent presentation manner of a process of mapping a PTSG-n to an OPUflex according to an embodiment of the present disclosure.

Further, an equivalent presentation manner of a process of mapping a PTSG-n to an OPUflex is shown in FIG. 11.

Specifically, the PTSG-n is synchronously mapped to a payload area of the OPUflex, one PTSG-n frame includes N 16-B code blocks, and N=LCM(238, n). That is, one PTSG-n frame includes 16-B code blocks that are r times 238 16-B code blocks, and r is equal to N/238. The process can be equivalently considered as inserting one 16-B overhead code block into every 238 16-B data code blocks, and the 16-B overhead code block is the first 16 bytes (an overhead area) of each row of an ODUflex frame. Correspondingly, after the synchronous mapping is completed, one PTSG-n frame correspondingly occupies r rows of an OPUflex frame. A rate of the OPUflex is (239/238)*n*Rts.

Further, after the M services are mapped to the variable optical payload unit according to the mapping procedure, the variable optical payload unit OPUflex or OPUKm mapped to the M services is obtained, and a corresponding ODUflex overhead or ODUKm overhead is added, and encapsulated into a corresponding ODUflex frame or ODUKm frame.

Figure 12:
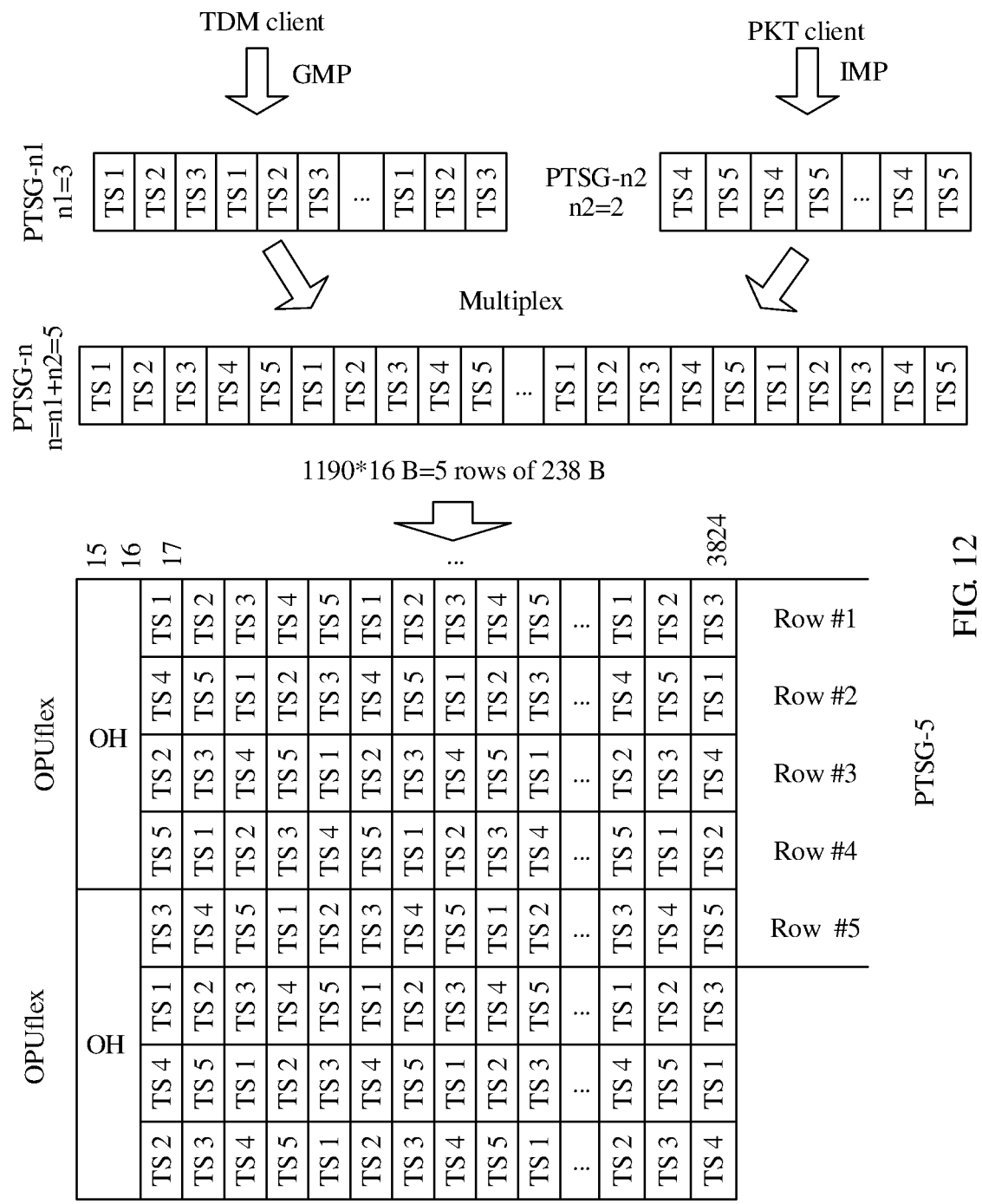
FIG. 12 is a schematic diagram of a specific process of mapping two services to an OPUflex according to an embodiment of the present disclosure.

As shown in FIG. 12, a specific process of mapping two services to the OPUflex by using the method provided in this embodiment of the present disclosure is as follows:

It is assumed that the two services are to be transported, mapping transport control information of a first service includes that the first service is a constant bit rate service, that is, a CBR service, a traffic volume of the first service is 3 Gbit/s; and the mapping transport control information of the second service includes that a second service is a packet service, that is, a PKT service, and a traffic volume of the second service is 2 Gbit/s. Determining a mapping procedure for the two services based on the foregoing mapping transport control information includes: After a plurality of carried services are taken into consideration, a PTSG-5 can be constructed to transport the two services at optimum bandwidth bearer efficiency, a rate of the PTSG-5 is 5 Gbit/s, the PTSG-5 includes five tributary slots, each tributary slot has a rate of 1 Gbit/s, a frame structure of the PTSG-5 is 1190 16-B code blocks, and the 1190 16-B code blocks can be obtained by using an LCM(238, 5). Correspondingly, the first CBR service occupies three tributary slots, and the second PKT service occupies two tributary slots.

Further, according to the mapping procedure, the first CBR service is mapped to a subcontainer PTSG-$n_1$ of the PTSG-5 by using a GMP, $n_1$=3, and the PTSG-$n_1$ includes a tributary slot 1, a tributary slot 2, and a tributary slot 3 of the PTSG-5; the second PKT service is mapped to a subcontainer PTSG-$n_2$ of the PTSG-5 by using an IMP, $n_2$=2, and the PTSG-$n_2$ includes a tributary slot 4 and a tributary slot 5 of the PTSG-5. In addition, mapping overhead information of the two services needs to be generated, and is placed in corresponding tributary slot overheads of the PTSG-5. For example, mapping overhead information of the first CBR service is placed in a third tributary slot overhead of the PTSG-5, mapping overhead information of the second PKT service is placed in a fifth tributary slot overhead of the PTSG-5, and the other three tributary slot overheads of the PTSG-5 are reserved.

The PTSG-5 is mapped to a payload area of the OPUflex in a bit synchronous mapping manner, 1190 16-B code blocks are corresponding to five rows of a payload area of an ODUflex frame, and the 119016-B code blocks are successively placed at corresponding locations of the payload area of the ODUflex frame. As shown in FIG. 11, other tributary slot overhead information of the PTSG-5 is added to an overhead area of the OPUflex, and a rate of an ODUflex is (239/238)*5 Gbit/s.

Figure 13:
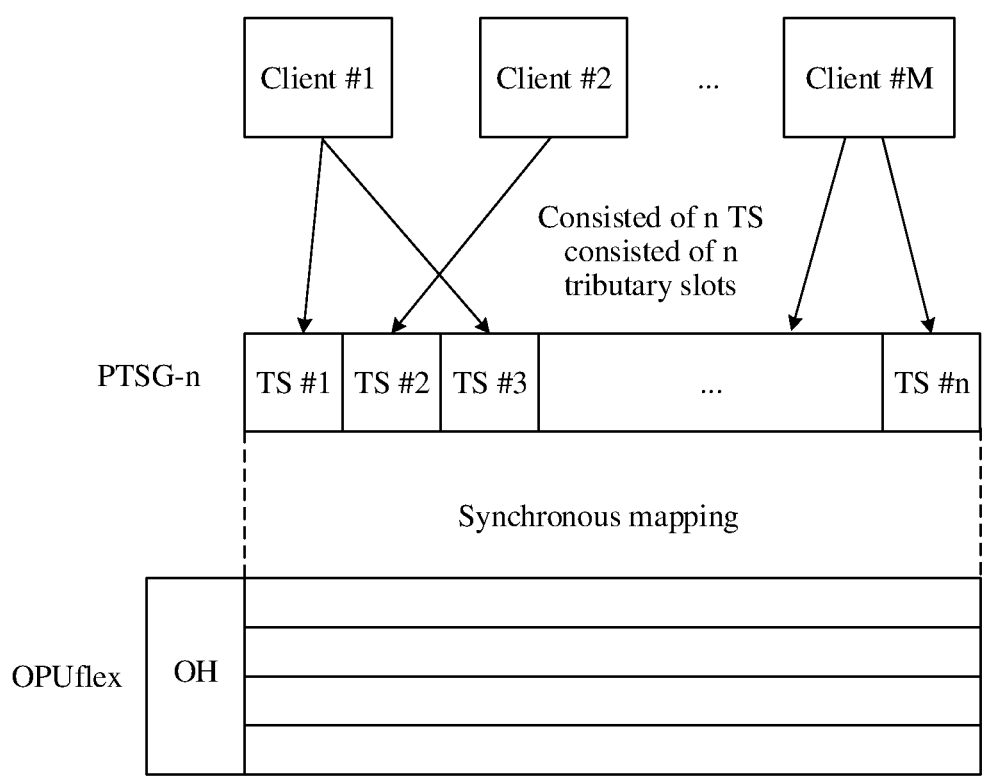
FIG. 13 is a schematic diagram of mapping a plurality of client services to a variable optical payload unit according to an embodiment of the present disclosure.
Figure 14:
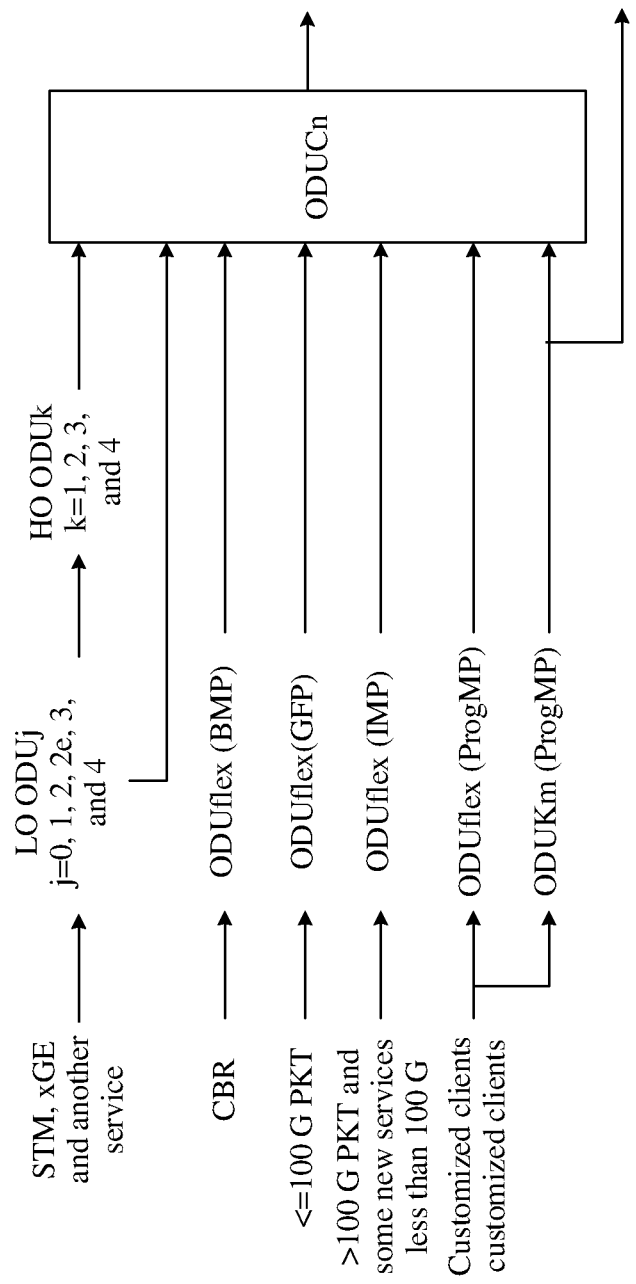
FIG. 14 is a schematic diagram of a new transport solution according to an embodiment of the present disclosure.

It can be learned from the foregoing that this embodiment of the present disclosure provides the multi-service sending method. For example, the variable optical payload unit is the OPUflex. As shown in FIG. 13, a plurality of client services are mapped to at least one tributary slot of the PTSG-n, and the PTSG-n is further mapped to the variable optical payload unit. A transport solution is flexibly customized based on a transport requirement of a client service, so that a data plane becomes programmable. Mapping can be flexibly performed according to a requirement, implementing mixed bearing of services with a plurality of rates, and meeting a customized transport requirement of the client service. In addition, a rate of a bearer container can be flexibly changed, and tributary slots are divided flexibly, improving bandwidth utilization. The method is also compatible with an existing ODUflex frame structure and an existing overhead monitoring mechanism. As shown in FIG. 14, last two paths are multi-service transport solutions provided in the present disclosure, respectively corresponding to the ODUflex and the ODUKm.

Figure 15:
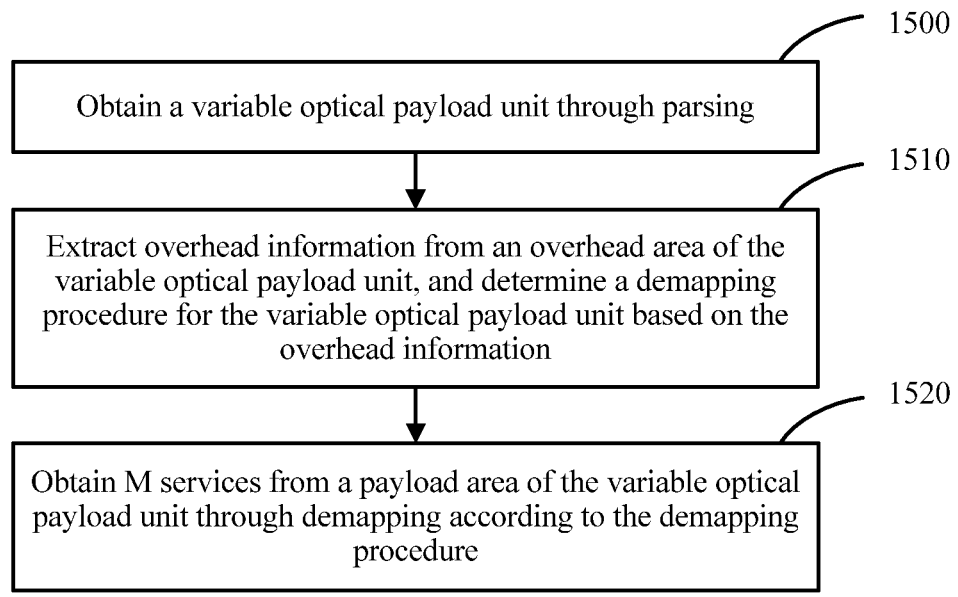
FIG. 15 is an overview flowchart of a multi-service receiving method according to an embodiment of the present disclosure.

As shown in FIG. 15, based on the foregoing multi-service sending method, an embodiment of the present disclosure further provides a multi-service receiving method, including the following steps.

Step 1500: Obtain a variable optical payload unit through parsing.

For example, an ODUflex frame is received, an ODUflex overhead is extracted, and an OPUflex frame is obtained through parsing.

Step 1510: Extract overhead information from an overhead area of the variable optical payload unit, and determine a demapping procedure for the variable optical payload unit based on the overhead information, where the demapping procedure is used to obtain M services from the variable optical payload unit through demapping by using a programmable tributary slot group frame, the programmable tributary slot group frame is a tributary slot set used to meet transport requirements respectively corresponding to the M services, and M≥2.

Step 1520: Obtain the M services from a payload area of the variable optical payload unit through demapping according to the demapping procedure.

The demapping procedure includes a quantity of tributary slots included in the programmable tributary slot group frame, a frame structure of the programmable tributary slot group frame, and a quantity of tributary slots occupied by each of the M services.

For step 1510, the extracting overhead information from an overhead area of the variable optical payload unit, and determining a demapping procedure for the variable optical payload unit based on the overhead information includes the following two aspects:

First, a quantity n of tributary slots included in the programmable tributary slot group frame and the quantity of tributary slots occupied by each service are determined based on the overhead information, where n≥1.

Specifically, as shown in FIG. 9, a PSI[0] is extracted at a first preset location in the overhead area of the variable optical payload unit, and a PT overhead value carried by the PSI[0] is identified, where the PT overhead value is a first preset value, and the first preset value is used to indicate that the variable optical payload unit carries a plurality of services; a PSI[1] is extracted, and n carried by the PSI[1] is identified, where n is used to indicate the quantity of tributary slots included in the programmable tributary slot group frame; and a PSI[2] to a PSI[n+1] are extracted, and the PSI[2] to the PSI[n+1] are identified, where the PSI[2] to the PSI[n+1] are used to indicate an allocation and occupation status of each tributary slot, determine that the variable optical payload unit carries the M services, and determine the quantity of tributary slots occupied by each service, a PSI[j] is corresponding to a tributary slot (j−1) in the programmable tributary slot group frame, and is used to indicate an allocation and occupation status of the tributary slot (j−1), and 2≤j≤n+1.

The PSI[j] includes an occupation indication field and a service indication field, the occupation indication field is used to indicate whether the tributary slot (j−1) is occupied, and the service indication field is used to indicate a service identifier of a service carried by the tributary slot (j−1) when the tributary slot (j−1) is occupied.

Second, the frame structure of the programmable tributary slot group frame is determined based on the quantity n of tributary slots included in the programmable tributary slot group frame.

The frame structure of the programmable tributary slot group frame is: When the variable optical payload unit is an OPUflex, the programmable tributary slot group frame includes N1 code blocks whose preset code block granularity is s1 bytes, N1 is a common multiple of 3808/s1 and n, and a rate of the programmable tributary slot group frame is n times a tributary slot rate.

Optionally, N1 is the least common multiple of 3808/s1 and n.

The frame structure of the programmable tributary slot group frame is: When the variable optical payload unit is an OPUKm, the programmable tributary slot group frame includes N2 code blocks whose preset code block granularity is s2 bytes, N2 is a common multiple of 3808*m/s2 and n, m is a quantity of OPU instances included in the OPUKm, and a rate of the programmable tributary slot group frame is n times a tributary slot rate.

Optionally, N2 is the least common multiple of 3808*m/s2 and n.

For example, if the variable optical payload unit is the OPUflex, PT=0×23, and n=5, OCCUs respectively corresponding to a PSI[2] to a PSI[6] are all 1, that is, five tributary slots are all occupied. CIDs corresponding to the PSI[2] and the PSI[3] both carry a service identifier 1, the PSI[4] carries a service identifier 2, and CIDs corresponding to the PSI[5] and the PSI[6] both carry a service identifier 3. It can be learned accordingly that the variable optical payload unit carries a plurality of services, and specifically, three services. A quantity of tributary slots occupied by a service 1 is 2, a quantity of tributary slots occupied by a service 2 is 1, and a quantity of tributary slots occupied by a service 3 is 2. A frame structure of a PTSG-5 includes 1190 code blocks whose preset code block granularity is 16 bytes, and 1190=LCM(238, 5).

It should be known that a process herein is reverse to a process of adding overhead information, and content that is the same as the content in the foregoing multi-service transport process is not described again.

For step 1520, the obtaining the M services from a payload area of the variable optical payload unit through demapping according to the demapping procedure includes the following two steps: first, obtaining at least one programmable tributary slot group frame from the payload area of the variable optical payload unit through demapping based on the frame structure of the programmable tributary slot group frame; and then, obtaining M services from each programmable tributary slot group frame through demapping based on the quantity of tributary slots occupied by each service.

Specifically, the obtaining at least one programmable tributary slot group frame from the payload area of the variable optical payload unit through demapping based on the frame structure of the programmable tributary slot group frame includes two possible cases.

In a first case, when the variable optical payload unit is the OPUflex, one programmable tributary slot group frame is obtained from every r1 rows of the payload area of the variable optical payload unit through demapping based on a frame structure of a programmable tributary slot group frame corresponding to the OPUflex, where r1=N1*s1/3808, and each row of a payload area of the OPUflex includes 3808/51 code blocks whose preset code block granularity is s1 bytes.

In a second case, when the variable optical payload unit is the OPUKm, one programmable tributary slot group frame is obtained from every r2 rows of the payload area of the variable optical payload unit through demapping based on a frame structure of a programmable tributary slot group frame corresponding to the OPUKm, where r2=N2*s2/(3808*m), and each row of a payload area of the OPUKm includes 3808*m/s2 code blocks whose preset code block granularity is S2 bytes.

When the M services are obtained from each programmable tributary slot group frame through demapping based on the quantity of tributary slots occupied by each service, a tributary slot overhead of each tributary slot further needs to be extracted, and mapping overhead information respectively corresponding to the M services needs to be identified according to a preset rule.

For each programmable tributary slot group frame, the following step is performed: obtaining, from the current programmable tributary slot group frame through demapping based on the quantity of tributary slots occupied by each service, M subcontainers respectively corresponding to the M services, where an $i^{th}$ subcontainer is corresponding to an $i^{th}$ service, the $i^{th}$ subcontainer includes $n_i$ tributary slots that the $i^{th}$ service needs to occupy, and $n_1+n_2+ \ldots + n_i+ \ldots +n_M \leq n$; and respectively obtaining the M services from the M subcontainers through demapping based on the M subcontainers respectively corresponding to the M services and the mapping overhead information respectively corresponding to the M services.

A specific demapping method may be a GMP, an IMP, a GFP, or the like. For example, the GMP may be used for a constant bit rate service, and the IMP or the GFP may be used for a packet service.

The preset rule is: Mapping overhead information for a $t^{th}$ service is stored in a tributary slot overhead corresponding to a first tributary slot or a tributary slot overhead corresponding to a last tributary slot in a $t^{th}$ subcontainer corresponding to the $t^{th}$ service, $1 \leq t \leq M$, and the $t^{th}$ service is any one of the M services.

Figure 16:
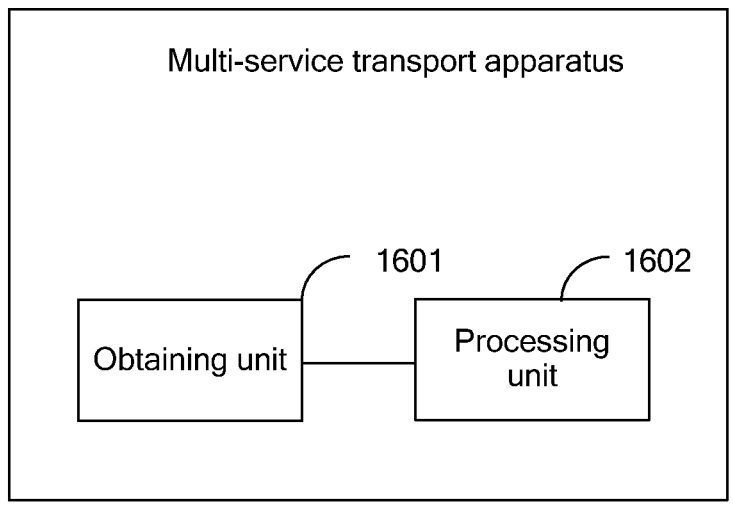
FIG. 16 is a schematic structural diagram of a multi-service transport apparatus according to an embodiment of the present disclosure.

Based on an inventive concept the same as that of the embodiment corresponding to FIG. 4, as shown in FIG. 16, an embodiment of the present disclosure further provides a multi-service transport apparatus. Content that is the same as the content of the embodiment corresponding to FIG. 4 is not described in this embodiment again.

As shown in FIG. 16, this embodiment of the present disclosure provides the multi-service transport apparatus, including: an obtaining unit 1601, configured to obtain mapping transport control information of M services, where mapping transport control information of each service carries a transport requirement of the service, and M≥2; and a processing unit 1602, configured to: determine a mapping procedure for the M services based on the mapping transport control information of the M services, where the mapping procedure is used to map the M services to a variable optical payload unit by using a programmable tributary slot group frame, and the programmable tributary slot group frame is a tributary slot set used to meet transport requirements respectively corresponding to the M services; and map the M services to the variable optical payload unit according to the mapping procedure.

In an optional implementation, the transport requirement of each service includes a traffic volume required by the service; the mapping procedure includes at least: a quantity of tributary slots included in the programmable tributary slot group frame, a tributary slot rate, a frame structure of the programmable tributary slot group frame, and a quantity of tributary slots that each of the M services needs to occupy; and when determining the mapping procedure for the M services based on the mapping transport control information of the M services, the processing unit 1602 is configured to: determine, based on traffic volumes respectively corresponding to the M services, a quantity n of tributary slots included in the programmable tributary slot group frame and the tributary slot rate, where n≥1; determine the frame structure of the programmable tributary slot group frame based on the quantity n of tributary slots included in the programmable tributary slot group frame; and determine, based on the traffic volumes respectively corresponding to the M services and the tributary slot rate, the quantity of tributary slots that each service needs to occupy.

In an optional implementation, when determining, based on the traffic volumes respectively corresponding to the M services, the quantity n of tributary slots included in the payload tributary slot group frame and the tributary slot rate, the processing unit 1602 is configured to: calculate a proportional relationship for the traffic volumes of the M services based on the traffic volumes respectively corresponding to the M services; and determine, based on the traffic volumes respectively corresponding to the M services and the proportional relationship, the quantity n of tributary slots included in the programmable tributary slot group frame and the tributary slot rate.

In an optional implementation, the frame structure of the programmable tributary slot group frame is: When the variable optical payload unit is an OPUflex, the programmable tributary slot group frame includes N1 code blocks whose preset code block granularity is s1 bytes, N1 is a common multiple of 3808/s1 and n, a rate of the programmable tributary slot group frame is n times the tributary slot rate, and a rate of the variable optical payload unit OPUflex is (239/238)*n times the tributary slot rate.

In an optional implementation, N1 is the least common multiple of 3808/s1 and n.

In an optional implementation, the frame structure of the programmable tributary slot group frame is: When the variable optical payload unit is an OPUKm, the programmable tributary slot group frame includes N2 code blocks whose preset code block granularity is s2 bytes, N2 is a common multiple of 3808*m/s2 and n, m is a quantity of OPU instances included in the OPUKm, a rate of the programmable tributary slot group frame is n times the tributary slot rate, and a rate of the variable optical payload unit OPUKm is (239/238)*n times the tributary slot rate.

In an optional implementation, N2 is the least common multiple of 3808*m/s2 and n.

In an optional implementation, when mapping the M services to the variable optical payload unit according to the mapping procedure, the processing unit 1602 is configured to: separately map the M services to at least one tributary slot of the programmable tributary slot group frame based on the quantity of tributary slots that each service needs to occupy, to obtain at least one programmable tributary slot group frame to which the M services are mapped; map, to a payload area of the variable optical payload unit based on the frame structure of the programmable tributary slot group frame, the at least one programmable tributary slot group frame to which the M services are mapped; and add, to an overhead area of the variable optical payload unit, overhead information required to transport the M services.

In an optional implementation, when separately mapping the M services to the at least one tributary slot of the programmable tributary slot group frame based on the quantity of tributary slots that each service needs to occupy, the processing unit 1602 is configured to: for each service, map, based on a quantity of tributary slots that a current service needs to occupy, the current service to a corresponding subcontainer included in the programmable tributary slot group frame, where the programmable tributary slot group frame includes M subcontainers obtained after division performed according to the M services, an $i^{th}$ subcontainer is corresponding to an $i^{th}$ service, the $i^{th}$ subcontainer includes $n_i$ tributary slots that the $i^{th}$ service needs to occupy, and $n_1+n_2+ \ldots +n_i+ \ldots +n_M \leq n$.

In an optional implementation, the transport requirement of each service includes a service type of the service; and when separately mapping the M services to the at least one tributary slot of the programmable tributary slot group frame, the processing unit 1602 is configured to: if the M services include K services whose service type is a packet service, aggregate, into one integral service, the K services whose service type is a packet service, where a quantity of tributary slots that the integral service needs to occupy is the sum of quantities of tributary slots separately occupied by the K services whose service type is a packet service, and K≥2; and for each service, map, based on a quantity of tributary slots that a current service needs to occupy, the current service to a corresponding subcontainer included in the programmable tributary slot group frame, where the programmable tributary slot group frame includes M* subcontainers obtained after division performed according to M* services, M*=M−K+1, an $i^{th}$ subcontainer is corresponding to an $i^{th}$ service, the $i^{th}$ subcontainer includes $n_i$ tributary slots that the $i^{th}$ service needs to occupy, and $n_1+n_2+ \ldots + n_i+ \ldots +n_{M*} \leq n$.

In an optional implementation, when mapping, to the payload area of the variable optical payload unit based on the frame structure of the programmable tributary slot group frame, the at least one payload tributary slot group frame to which the M services are mapped, the processing unit 1602 is configured to: when the variable optical payload unit is the OPUflex, for each programmable tributary slot group frame, successively map, to r1 rows of a payload area of the OPUflex based on a frame structure of a programmable tributary slot group frame corresponding to the OPUflex, N1 code blocks that are in the current programmable tributary slot group frame and whose preset code block granularity is s1 bytes, where r1=N1*s1/3808, and each row of the payload area of the OPUflex includes 3808/s1 code blocks whose preset code block granularity is s1 bytes.

In an optional implementation, when mapping, to the payload area of the variable optical payload unit based on the frame structure of the programmable tributary slot group frame, the at least one programmable tributary slot group frame to which the M services are mapped, the processing unit 1602 is configured to: when the variable optical payload unit is the OPUKm, for each payload tributary slot group frame, successively map, to r2 rows of a payload area of the OPUKm based on a frame structure of a programmable tributary slot group frame corresponding to the OPUKm, N2 code blocks that are in the current programmable tributary slot group frame and whose preset code block granularity is s2 bytes, where r2=N2*s2/(3808*m), and each row of the payload area of the OPUKm includes 3808*m/s2 code blocks whose preset code block granularity is S2 bytes.

In an optional implementation, before adding, to the overhead area of the variable optical payload unit, the overhead information required to transport the M services, the processing unit 1602 is further configured to: generate mapping overhead information for each service; and when adding, to the overhead area of the variable optical payload unit, the overhead information required to transport the M services, the processing unit 1602 is configured to: add a payload structure identifier PSI[0] at a first preset location in the overhead area of the variable optical payload unit, where the PSI[0] carries a payload type PT overhead value and is corresponding to a multiframe alignment signal MFAS=0, the PT overhead value is a first preset value, and the first preset value is used to indicate that the variable optical payload unit carries a plurality of services; add a PSI[1], where the PSI[1] carries n and is corresponding to an MFAS=1; and add a PSI[2] to a PSI[n+1], where the PSI[2] to the PSI[n+1] are respectively corresponding to an MFAS=2 to an MFAS=n+1, and are used to indicate an allocation and occupation status of each tributary slot, a PSI[j] is corresponding to an MFAS=j, is corresponding to a tributary slot (j−1) in the programmable tributary slot group frame, and is used to indicate an allocation and occupation status of the tributary slot (j−1), and 2≤j≤n+1; and add an optical payload unit multiframe identifier OMFI at a second preset location in the overhead area of the variable optical payload unit, where a value of the OMFI is 0 to n−1; when the value of the OMFI is k, it indicates that a tributary slot overhead added at a third preset location in the overhead area of the variable optical payload unit is a tributary slot overhead of a tributary slot (k+1) in the programmable tributary slot group frame; 0≤k≤n−1; and the tributary slot overhead is used to store the mapping overhead information according to a preset rule.

In an optional implementation, the PSI[j] includes an occupation indication field and a service indication field, the occupation indication field is used to indicate whether the tributary slot (j−1) is occupied, and the service indication field is used to indicate a service identifier of a service carried by the tributary slot (j−1) when the tributary slot (j−1) is occupied.

In an optional implementation, the preset rule is: Mapping overhead information for a $t^{th}$ service is stored in a tributary slot overhead corresponding to a first tributary slot or a tributary slot overhead corresponding to a last tributary slot in a $t^{th}$ subcontainer corresponding to the $t^{th}$ service, 1≤t≤M, and the $t^{th}$ service is any one of the M services.

Figure 17:
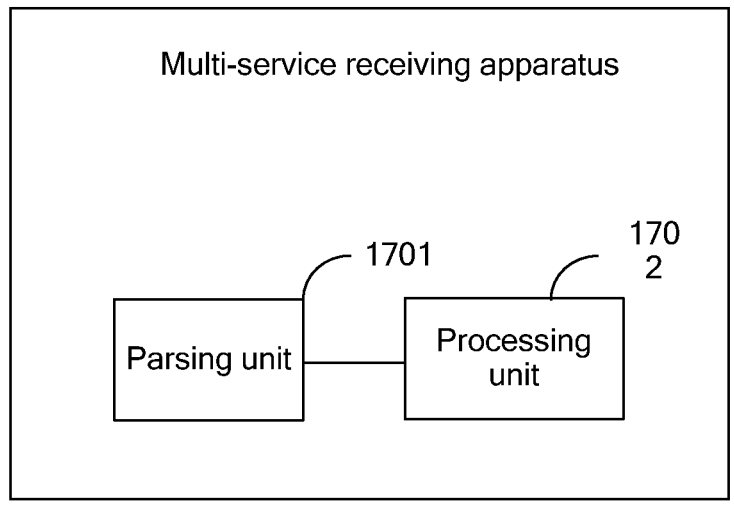
FIG. 17 is a schematic structural diagram of a multi-service receiving apparatus according to an embodiment of the present disclosure.

Based on an inventive concept the same as that of the embodiment corresponding to FIG. 15, as shown in FIG. 17, an embodiment of the present disclosure further provides a multi-service receiving apparatus. Content that is the same as the content of the embodiment corresponding to FIG. 15 is not described in this embodiment again.

As shown in FIG. 17, this embodiment of the present disclosure provides the multi-service receiving apparatus, including: a parsing unit 1701, configured to obtain a variable optical payload unit through parsing; and a processing unit 1702, configured to: extract overhead information from an overhead area of the variable optical payload unit, and determine a demapping procedure for the variable optical payload unit based on the overhead information, where the demapping procedure is used to obtain M services from the variable optical payload unit through demapping by using a programmable tributary slot group frame, the programmable tributary slot group frame is used to meet transport requirements respectively corresponding to the M services, and M≥2; and obtain the M services from a payload area of the variable optical payload unit through demapping according to the demapping procedure.

In an optional implementation, the demapping procedure includes a quantity of tributary slots included in the programmable tributary slot group frame, a frame structure of the programmable tributary slot group frame, and a quantity of tributary slots occupied by each of the M services; and when extracting the overhead information from the overhead area of the variable optical payload unit, and determining the demapping procedure for the variable optical payload unit based on the overhead information, the processing unit 1702 is configured to: determine, based on the overhead information, a quantity n of tributary slots included in the programmable tributary slot group frame and the quantity of tributary slots occupied by each service, where n≥1; and determine the frame structure of the programmable tributary slot group frame based on the quantity n of tributary slots included in the programmable tributary slot group frame.

In an optional implementation, when determining, based on the overhead information, the quantity n of tributary slots included in the programmable tributary slot group frame and the quantity of tributary slots occupied by each service, the processing unit 1702 is configured to: extract a PSI[0] at a first preset location in the overhead area of the variable optical payload unit, and identify a PT overhead value carried by the PSI[0], where the PT overhead value is a first preset value, and the first preset value is used to indicate that the variable optical payload unit carries a plurality of services; extract a PSI[1], and identify n carried by the PSI[1], where n is used to indicate the quantity of tributary slots included in the programmable tributary slot group frame; and extract a PSI[2] to a PSI[n+1], and identify the PSI[2] to the PSI[n+1], where the PSI[2] to the PSI[n+1] are used to indicate an allocation and occupation status of each tributary slot, determine that the variable optical payload unit carries the M services, and determine the quantity of tributary slots occupied by each service, a PSI[j] is corresponding to a tributary slot (j−1) in the programmable tributary slot group frame, and is used to indicate an allocation and occupation status of the tributary slot (j−1), and 2≤j≤n+1.

In an optional implementation, the PSI[j] includes an occupation indication field and a service indication field, the occupation indication field is used to indicate whether the tributary slot (j−1) is occupied, and the service indication field is used to indicate a service identifier of a service carried by the tributary slot (j−1) when the tributary slot (j−1) is occupied.

In an optional implementation, the frame structure of the programmable tributary slot group frame is: When the variable optical payload unit is an OPUflex, the programmable tributary slot group frame includes N1 code blocks whose preset code block granularity is s1 bytes, N1 is a common multiple of 3808/s1 and n, and a rate of the programmable tributary slot group frame is n times a tributary slot rate.

In an optional implementation, N1 is the least common multiple of 3808/s1 and n.

In an optional implementation, the frame structure of the programmable tributary slot group frame is: When the variable optical payload unit is an OPUKm, the programmable tributary slot group frame includes N2 code blocks whose preset code block granularity is s2 bytes, N2 is a common multiple of 3808*m/s2 and n, m is a quantity of OPU instances included in the OPUKm, and a rate of the programmable tributary slot group frame is n times a tributary slot rate.

In an optional implementation, N2 is the least common multiple of 3808*m/s2 and n.

In an optional implementation, when obtaining the M services from the payload area of the variable optical payload unit through demapping according to the demapping procedure, the processing unit 1702 is configured to: obtain at least one programmable tributary slot group frame from the payload area of the variable optical payload unit through demapping based on the frame structure of the programmable tributary slot group frame; and obtain M services from each programmable tributary slot group frame through demapping based on the quantity of tributary slots occupied by each service.

In an optional implementation, when obtaining the at least one programmable tributary slot group frame from the payload area of the variable optical payload unit through demapping based on the frame structure of the programmable tributary slot group frame, the processing unit 1702 is configured to: when the variable optical payload unit is the OPUflex, obtain one programmable tributary slot group frame from every r1 rows of the payload area of the variable optical payload unit through demapping based on a frame structure of a programmable tributary slot group frame corresponding to the OPUflex, where r1=N1*s1/3808, and each row of a payload area of the OPUflex includes 3808/s1 code blocks whose preset code block granularity is s1 bytes.

In an optional implementation, when obtaining the at least one programmable tributary slot group frame from the payload area of the variable optical payload unit through demapping based on the frame structure of the programmable tributary slot group frame, the processing unit 1702 is configured to: when the variable optical payload unit is the OPUKm, obtain one programmable tributary slot group frame from every r2 rows of the payload area of the variable optical payload unit through demapping based on a frame structure of a programmable tributary slot group frame corresponding to the OPUKm, where r2=N2*s2/(3808*m), and each row of a payload area of the OPUKm includes 3808*m/s2 code blocks whose preset code block granularity is s2 bytes.

In an optional implementation, when extracting the overhead information from the overhead area of the variable optical payload unit, the processing unit 1702 is further configured to: extract a tributary slot overhead of each tributary slot, and identify, according to a preset rule, mapping overhead information respectively corresponding to the M services; and when obtaining the M services from each programmable tributary slot group frame through demapping based on the quantity of tributary slots occupied by each service, the processing unit 1702 is configured to: for each programmable tributary slot group frame, obtain, from the current programmable tributary slot group frame through demapping based on the quantity of tributary slots occupied by each service, M subcontainers respectively corresponding to the M services, where an $i^{th}$ subcontainer is corresponding to an $i^{th}$ service, the $i^{th}$ subcontainer includes $n_i$ tributary slots that the $i^{th}$ service needs to occupy, and $n_1+n_2+\ldots+n_i+\ldots+n_M \leq n$; and respectively obtain the M services from the M subcontainers through demapping based on the M subcontainers respectively corresponding to the M services and the mapping overhead information respectively corresponding to the M services.

In an optional implementation, the preset rule is: Mapping overhead information for a $t^{th}$ service is stored in a tributary slot overhead corresponding to a first tributary slot or a tributary slot overhead corresponding to a last tributary slot in a $t^{th}$ subcontainer corresponding to the $t^{th}$ service, 1≤t≤M, and the $t^{th}$ service is any one of the M services.

Figure 18:
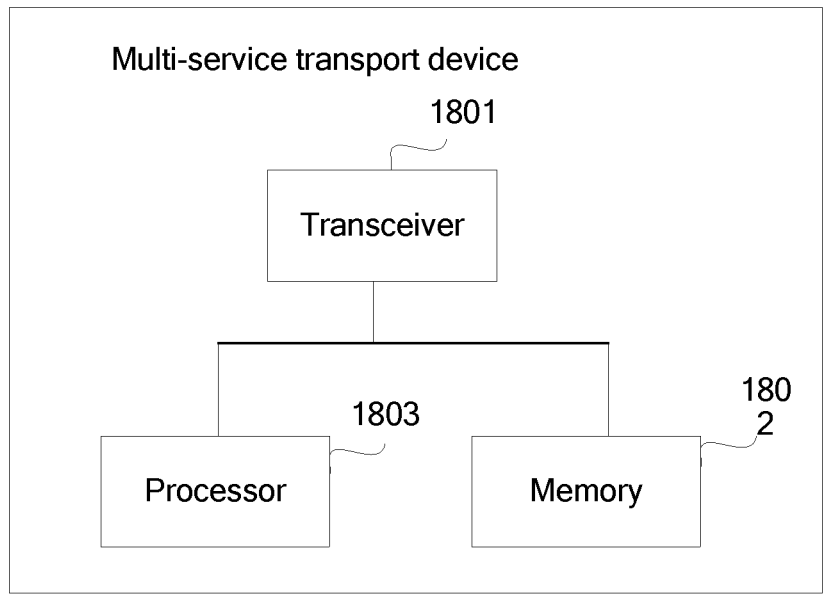
FIG. 18 is a schematic structural diagram of a multi-service transport device according to an embodiment of the present disclosure.

As shown in FIG. 18, an embodiment of the present disclosure provides a multi-service transport device, for example, an OTN device. The device includes: a transceiver 1801; a memory 1802, configured to store an instruction; and a processor 1803, separately connected to the transceiver and the memory, and configured to perform the following operations according to the instruction stored in the memory: obtaining mapping transport control information of M services by using the transceiver, where mapping transport control information of each service carries a transport requirement of the service, and M≥2; determining a mapping procedure for the M services based on the mapping transport control information of the M services, where the mapping procedure is used to map the M services to a variable optical payload unit by using a programmable tributary slot group frame, and the programmable tributary slot group frame is a tributary slot set used to meet transport requirements respectively corresponding to the M services; and mapping the M services to the variable optical payload unit according to the mapping procedure.

Figure 19:
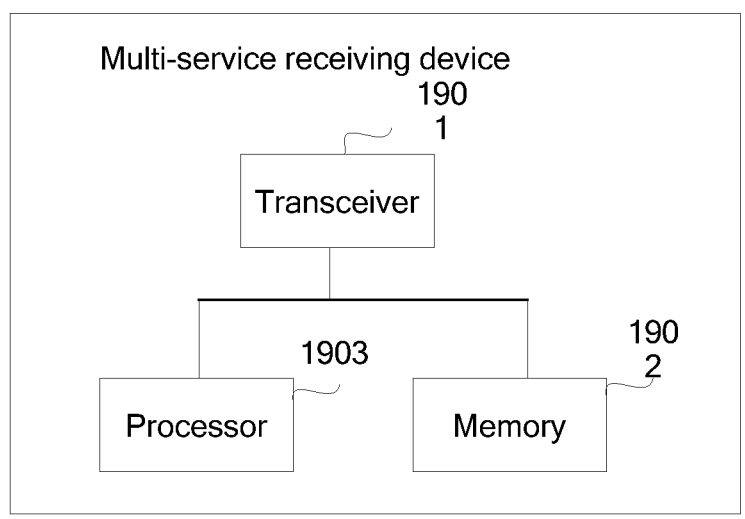
FIG. 19 is a schematic structural diagram of a multi-service receiving device according to an embodiment of the present disclosure.

As shown in FIG. 19, an embodiment of the present disclosure provides a multi-service receiving apparatus, including: a transceiver 1901; a memory 1902, configured to store an instruction; and a processor 1903, separately connected to the transceiver and the memory, and configured to perform the following operations according to the instruction stored in the memory: obtaining a variable optical payload unit through parsing; extracting overhead information from an overhead area of the variable optical payload unit, and determining a demapping procedure for the variable optical payload unit based on the overhead information, where the demapping procedure is used to obtain M services from the variable optical payload unit through demapping by using a programmable tributary slot group frame, the programmable tributary slot group frame is used to meet transport requirements respectively corresponding to the M services, and M≥2; and obtaining the M services from a payload area of the variable optical payload unit through demapping according to the demapping procedure.

It should be noted that a manner of a connection between parts shown in FIG. 18 and FIG. 19 is only a possible example. Alternatively, the transceiver and the memory are separately connected to the processor, and the transceiver is not connected to the memory. Alternatively, another possible connection manner may be used.

As shown in FIG. 18 and FIG. 19, the memory in the foregoing embodiment is configured to store program code executed by the processor, and may be a volatile memory, for example, a random-access memory (RAM). The memory may also be a non-volatile memory, for example, a read-only memory (ROM), a flash memory, a hard disk drive (HDD), or a solid-state drive (SSD). Alternatively, the memory is any other medium that can be used to carry or store expected program code in an instruction or data structure form and that can be accessed by a computer. The present disclosure is not limited thereto. The memory may be a combination of the foregoing memories.

As shown in FIG. 18 and FIG. 19, the processor in the foregoing embodiments may be a central processing unit (CPU).

In addition, FIG. 18 and FIG. 19 may show a same OTN device having functions of transporting and receiving a plurality of services.

In conclusion, the embodiments of the present disclosure provide the multi-service transport method, including: obtaining the mapping transport control information of the M services; determining the mapping procedure of the M services; and mapping the M services to the variable optical payload unit according to the mapping procedure, that is, mapping M client services to at least one tributary slot of a PTSG-n, and further mapping the PTSG-n to the variable optical payload unit. A transport solution is flexibly customized based on a transport requirement of a client service, so that the data plane becomes programmable. Mapping can be flexibly performed according to a requirement, implementing mixed bearing of services with a plurality of rates, and meeting a customized transport requirement of the client service. In addition, a rate of a bearer container can be flexibly changed, and tributary slots are divided flexibly, improving bandwidth utilization. The method is also compatible with an existing ODUflex frame structure and an existing overhead monitoring mechanism.

In addition, the embodiments of the present disclosure further provide the multi-service receiving method. The multi-service receiving method is a reverse process of the multi-service transport method. After the variable optical payload unit is obtained through parsing, the demapping procedure is determined based on the overhead area of the variable optical payload unit, and the M services are obtained from the variable optical payload unit through demapping according to the demapping procedure. Therefore, the services with a plurality of rates can be carried in a mixed manner, and the customized transport requirement of the client service can be met.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A multi-service transport method, the method comprising:
    obtaining, by a device, mapping transport control information of M services, wherein mapping transport control information of each service of the M services carries a transport requirement of a respective service;
    determining, by the device, a mapping procedure for the M services based on the mapping transport control information of the M services, wherein the mapping procedure is used to map the M services to a variable optical payload unit by using a programmable tributary slot group frame, and the programmable tributary slot group frame is a tributary slot set used to meet transport requirements corresponding to the M services; and
    mapping, by the device, the M services to the variable optical payload unit according to the mapping procedure.

2. The method according to claim 1,
    wherein the transport requirement of each service comprises a traffic volume associated with the respective service;
    wherein the mapping procedure comprises: a quantity of tributary slots comprised in the programmable tributary slot group frame, a tributary slot rate, a frame structure of the programmable tributary slot group frame, and a quantity of tributary slots that each of the M services occupy; and
    wherein determining the mapping procedure comprises:
        determining, based on traffic volumes respectively corresponding to the M services, a quantity n of tributary slots comprised in the programmable tributary slot group frame and the tributary slot rate, wherein $n \geq 1$;
        determining the frame structure of the programmable tributary slot group frame based on the quantity n of tributary slots comprised in the programmable tributary slot group frame; and
        determining, based on the traffic volumes respectively corresponding to the M services and the tributary slot rate, the quantity of tributary slots that each service needs to Occupy.

3. The method according to claim 2, wherein determining the quantity n of tributary slots comprises:
    calculating a proportional relationship for the traffic volumes of the M services based on the traffic volumes respectively corresponding to the M services; and
    determining, based on the traffic volumes respectively corresponding to the M services and the proportional relationship, the quantity n of tributary slots comprised in the programmable tributary slot group frame and the tributary slot rate.

4. The method according to claim 2, when the variable optical payload unit is an OPUflex, the programmable tributary slot group frame comprises N1 code blocks whose preset code block granularity is s1 bytes, N1 is a common multiple of 3808/s1 and the quantity n of tributary slots, a rate of the programmable tributary slot group frame is n times the tributary slot rate, and a rate of the variable optical payload unit OPUflex is (239/238)*n times the tributary slot rate.

5. The method according to claim 4, wherein N1 is the least common multiple of 3808/s1 and n.

6. The method according to claim 2, when the variable optical payload unit is an OPUKm, the programmable tributary slot group frame comprises N2 code blocks whose preset code block granularity is S2 bytes, N2 is a common multiple of 3808*m/s2 and the quantity n of tributary slots, m is a quantity of OPU instances comprised in the OPUKm, a rate of the programmable tributary slot group frame is n times the tributary slot rate, and a rate of the variable optical payload unit OPUKm is (239/238)*n times the tributary slot rate.

7. The method according to claim 6, wherein N2 is the least common multiple of 3808*m/s2 and the quantity n of tributary slots.

8. The method according to claim 1, wherein mapping the M services to the variable optical payload unit comprises:
    separately mapping the M services to a tributary slot of the programmable tributary slot group frame based on a quantity n of tributary slots that each service is configured to occupy, to obtain the programmable tributary slot group frame to which the M services are mapped;
    mapping, to a payload area of the variable optical payload unit based on a frame structure of the programmable tributary slot group frame, the programmable tributary slot group frame to which the M services are mapped; and
    adding, to an overhead area of the variable optical payload unit, overhead information to transport the M services.

9. The method according to claim 8, wherein separately mapping the M services comprises:
    for each service of the M services, mapping, based on a quantity of tributary slots that a current service is configured to occupy, the current service to a corresponding subcontainer comprised in the programmable tributary slot group frame, wherein the programmable tributary slot group frame comprises M subcontainers obtained after division performed according to the M services, an $i^{th}$ subcontainer is corresponding to an $i^{th}$ service, the $i^{th}$ subcontainer comprises $n_i$ tributary slots that the $i^{th}$ service needs to occupy, and $n_1+n_2+ \ldots + n_i+ \ldots +n_M \leq n$.

10. The method according to claim 8, wherein the transport requirement corresponding to each of the M services comprises a service type of that service; and
    wherein separately mapping the M services comprises:
        if the M services comprise K services whose service type is a packet service, aggregating, into one integral service, the K services whose service type is a packet service, wherein a quantity of tributary slots that the integral service needs to occupy is a sum of quantities of tributary slots separately occupied by the K services whose service type is a packet service, and $k \geq 2$; and for each service, mapping, based on a quantity of tributary slots that a current service needs to occupy, a current service to a corresponding subcontainer comprised in the programmable tributary slot group frame, wherein the programmable tributary slot group frame comprises M* subcontainers obtained after division performed according to M* services, M*=M−K+1, an $i^{th}$ subcontainer is corresponding to an $i^{th}$ service, the $i^{th}$ subcontainer comprises $n_i$ tributary slots that the $i^{th}$ service needs to occupy, and $n_1+n_2+ \ldots +n_i+ \ldots +n_{M^*} \leq n$.

11. The method according to claim 8, wherein mapping the programmable tributary slot group frame to which the M services are mapped comprises:

when the variable optical payload unit is an OPUflex, for each programmable tributary slot group frame, successively mapping, to r1 rows of a payload area of the OPUflex based on a frame structure of a current programmable tributary slot group frame corresponding to the OPUflex, N1 code blocks that are in the current programmable tributary slot group frame and whose preset code block granularity is s1 bytes, wherein r1=N1*s1/3808, and each row of the payload area of the OPUflex comprises 3808/s1 code blocks whose preset code block granularity is s1 bytes.

12. The method according to claim 8, wherein mapping the programmable tributary slot group frame to which the M services are mapped comprises:

when the variable optical payload unit is an OPUKm, for each programmable tributary slot group frame, successively mapping, to r2 rows of a payload area of the OPUKm based on a frame structure of a current programmable tributary slot group frame corresponding to the OPUKm, N2 code blocks that are in the current programmable tributary slot group frame and whose preset code block granularity is s2 bytes, wherein r2=N2*s2/(3808*m), and each row of the payload area of the OPUKm comprises 3808*m/s2 code blocks whose preset code block granularity is s2 bytes.

13. The method according to claim 8, wherein before adding the overhead information to transport the M services, the method further comprises:

generating mapping overhead information for each service; and wherein adding the overhead information to transport the M services comprises:

adding a first payload structure identifier PSI[0] at a first preset location in the overhead area of the variable optical payload unit, wherein the PSI[0] carries a payload type PT overhead value and corresponds to a multiframe alignment signal MFAS of zero, the PT overhead value is a first preset value, and the first preset value indicates that the variable optical payload unit carries a plurality of services;

adding a second payload structure identifier PSI[1], wherein the PSI[1] carries the quantity n of tributary slots and corresponds to an MFAS of one; and adding a third payload structure identifier PSI[2] to a (n+2)th payload structure identifier PSI[n+1], wherein the PSI[2] to the PSI[n+1] respectively correspond to an MFAS of two to an MFAS of n+1, and indicate an allocation and occupation status of each tributary slot, wherein a (j+1)th payload structure identifier PSI[j] corresponds to an MFAS of j, corresponding to a tributary slot (j−1) in the programmable tributary slot group frame, and indicates an allocation and occupation status of the tributary slot (j−1), and $2 \leq j \leq n+1$; and adding an optical payload unit multiframe identifier OMFI at a second preset location in the overhead area of the variable optical payload unit, wherein a value of the OMFI is zero to n−1, when the value of the OMFI is k, it indicates that a tributary slot overhead added at a third preset location in the overhead area of the variable optical payload unit is a tributary slot overhead of a tributary slot (k+1) in the programmable tributary slot group frame, $0 \leq k \leq n-1$, and the tributary slot overhead is used to store the mapping overhead information according to a preset rule.

14. The method according to claim 13, wherein the PSI[j] comprises an occupation indication field and a service indication field, the occupation indication field is used to indicate whether the tributary slot (j−1) is occupied, and the service indication field is used to indicate a service identifier of a service carried by the tributary slot (j−1) when the tributary slot (j−1) is occupied.

15. The method according to claim 13, wherein the preset rule is: mapping overhead information for a $t^{th}$ service is stored in a tributary slot overhead corresponding to a first tributary slot or a tributary slot overhead corresponding to a last tributary slot in a $t^{th}$ subcontainer corresponding to the $t^{th}$ service, $1 \leq t \leq M$, and the $t^{th}$ service is any one of the M services.

16. A multi-service transport apparatus comprising:

a processor; and a memory configured to store instructions that, when executed by the processor, cause the processor to:

obtain mapping transport control information of M services, wherein mapping transport control information of each service carries a transport requirement of a respective service; and determine a mapping procedure for the M services based on the mapping transport control information of the M services, wherein the mapping procedure is used to map the M services to a variable optical payload unit by using a programmable tributary slot group frame, and the programmable tributary slot group frame is a tributary slot set used to meet transport requirements respectively corresponding to the M services; and map the M services to the variable optical payload unit according to the mapping procedure.

17. The apparatus according to claim 16, wherein the transport requirement of each service comprises a traffic volume for the respective service;

the mapping procedure comprises: a quantity of tributary slots comprised in the programmable tributary slot group frame, a tributary slot rate, a frame structure of the programmable tributary slot group frame, or a quantity of tributary slots that each of the M services occupy; and wherein the instructions when determining the mapping procedure for the M services, cause the processor to:

determine, based on traffic volumes respectively corresponding to the M services, a quantity n of tributary slots comprised in the programmable tributary slot group frame and the tributary slot rate, wherein $n \geq 1$;

determine the frame structure of the programmable tributary slot group frame based on the quantity n of tributary slots comprised in the programmable tributary slot group frame; and determine, based on the traffic volumes respectively corresponding to the M services and the tributary slot rate, the quantity of tributary slots that each service needs to occupy.

18. The apparatus according to claim 17, wherein the instructions when determining the quantity n of tributary slots, cause the processor to:
calculate a proportional relationship for the traffic volumes of the M services based on the traffic volumes respectively corresponding to the M services; and
determine, based on the traffic volumes respectively corresponding to the M services and the proportional relationship, the quantity n of tributary slots comprised in the programmable tributary slot group frame and the tributary slot rate.

19. The apparatus according to claim 17, wherein when the variable optical payload unit is an OPUflex, the programmable tributary slot group frame comprises N1 code blocks whose preset code block granularity is s1 bytes, N1 is a common multiple of 3808/s1 and n, a rate of the programmable tributary slot group frame is n times the tributary slot rate, and a rate of the variable optical payload unit OPUflex is (239/238)*n times the tributary slot rate.

20. A multi-service receiving apparatus comprising:
a processor; and
a memory configured to store instructions that, when executed by the processor, cause the processor to:
obtain a variable optical payload unit through parsing; and
extract overhead information from an overhead area of the variable optical payload unit, and determine a demapping procedure for the variable optical payload unit based on the overhead information, wherein the demapping procedure is used to obtain M services from the variable optical payload unit through demapping by using a programmable tributary slot group frame, the programmable tributary slot group frame is used to meet transport requirements respectively corresponding to the M services; and
obtain the M services from a payload area of the variable optical payload unit through demapping according to the demapping procedure.

* * * * *

UNITED STATES PATENT AND TRADEMARK OFFICE
CERTIFICATE OF CORRECTION

PATENT NO. : 10,608,766 B2
APPLICATION NO. : 16/046632
DATED : March 31, 2020
INVENTOR(S) : Su Page 1 of 1

It is certified that error appears in the above-identified patent and that said Letters Patent is hereby corrected as shown below:

In the Claims

In Column 34, Line 18, Claim 6, delete "S2" and insert --s2--.

In Column 34, Line 67, Claim 10, delete "k≥2" and insert --K≥2--.

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*